(12) United States Patent
Chhabria et al.

(10) Patent No.: US 11,601,607 B2
(45) Date of Patent: Mar. 7, 2023

(54) INFRARED AND NON-INFRARED CHANNEL BLENDER FOR DEPTH MAPPING USING STRUCTURED LIGHT

(71) Applicant: META PLATFORMS TECHNOLOGIES, LLC, Menlo Park, CA (US)

(72) Inventors: Rajesh Lachhmandas Chhabria, San Jose, CA (US); Shuochen Su, Seattle, WA (US); Monica Stewart, Seattle, WA (US); David Vakrat, Sunnyvale, CA (US); Shengqiong Xie, Sunnyvale, CA (US); Michael Hall, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/069,709

(22) Filed: Oct. 13, 2020

(65) Prior Publication Data
US 2022/0030183 A1    Jan. 27, 2022

Related U.S. Application Data

(60) Provisional application No. 63/057,165, filed on Jul. 27, 2020.

(51) Int. Cl.
*H04N 5/33*      (2006.01)
*G02B 27/00*     (2006.01)
*G02B 27/01*     (2006.01)

(52) U.S. Cl.
CPC ........... *H04N 5/33* (2013.01); *G02B 27/0093* (2013.01); *G02B 27/0172* (2013.01); *G02B 2027/0178* (2013.01)

(58) Field of Classification Search
CPC ............. H04N 5/2256; H04N 9/04553; H04N 9/04555; H04N 5/2351; H04N 9/04563;
(Continued)

(56) References Cited

U.S. PATENT DOCUMENTS

| 2011/0293179 A1* | 12/2011 | Dikmen | ................. G06T 5/008 382/167 |
| 2013/0278726 A1 | 10/2013 | Muhammad et al. | |

(Continued)

OTHER PUBLICATIONS

International Search report and Written Opinion for International Application No. PCT/US2021/043051, dated Nov. 5, 2021, 8 pages.

*Primary Examiner* — Neil R Mikeska
(74) *Attorney, Agent, or Firm* — Morgan, Lewis & Bockius LLP

(57) ABSTRACT

An electronic device includes one or more processors and memory storing instructions for execution by the one or more processors. The stored instructions include instructions for: receiving infrared image information for a three-dimensional area; receiving non-infrared image information for the same three-dimensional area; performing nonlinear intensity adjustment for the received infrared image information; performing nonlinear intensity adjustment for the received non-infrared image information; blending the intensity-adjusted infrared image information and the intensity-adjusted non-infrared image information to obtain a merged image information; and providing the merged image information for determining a depth map. Also disclosed are a corresponding method performed by the electronic device and a computer readable storage medium storing instructions for execution by one or more processors of an electronic device.

18 Claims, 18 Drawing Sheets

(58) Field of Classification Search
CPC .............. H04N 5/332; H04N 9/04515; G02B 27/0172; G06T 3/4015
See application file for complete search history.

(56) References Cited

U.S. PATENT DOCUMENTS

| | | | |
|---|---|---|---|
| 2014/0240492 A1* | 8/2014 | Lee | G06K 9/2036 |
| | | | 348/136 |
| 2015/0256813 A1 | 9/2015 | Dal Mutto et al. | |
| 2015/0358560 A1 | 12/2015 | Boulanger et al. | |
| 2017/0230638 A1 | 8/2017 | Wajs et al. | |
| 2017/0308999 A1* | 10/2017 | Denny | G06T 5/00 |
| 2018/0197275 A1 | 7/2018 | Price et al. | |
| 2019/0110037 A1* | 4/2019 | Lukac | H01L 27/14621 |

* cited by examiner

INFRARED AND NON-INFRARED CHANNEL BLENDER FOR DEPTH MAPPING USING STRUCTURED LIGHT

RELATED APPLICATION

This application claims priority to U.S. Provisional Application No. 63/057,165, filed Jul. 27, 2020, which is hereby incorporated by reference in its entirety.

TECHNICAL FIELD

This application relates generally to image processing devices, and more specifically to image processing devices for depth mapping.

BACKGROUND

Mobile display devices are widely used for collecting and providing visual information to a user. For example, mobile phones are used for taking photographs and recording videos. Head-mounted display devices are gaining popularity for their ability to provide virtual reality and augmented reality information.

Depth sensing is an important technique for various applications, such as camera operations (e.g., taking photographs and recording videos), augmented reality operations, and security applications (e.g., face recognition, etc.).

However, conventional depth sensing techniques require significant computational resources, and suffer in detecting depths for regions with low texture or under low light conditions.

SUMMARY

Accordingly, there is a need for a depth sensing system that is accurate, lightweight, compact, and computationally efficient.

The devices and methods disclosed in this application use a blender that merges infrared image information and non-infrared image information, which reduces the computational load for depth mapping while improving the accuracy of depth mapping.

In accordance with some embodiments, an electronic device includes one or more processors; and memory storing instructions for execution by the one or more processors. The stored instructions include instructions for: receiving infrared image information for a three-dimensional area; receiving non-infrared image information for the same three-dimensional area; performing nonlinear intensity adjustment for the received infrared image information; performing nonlinear intensity adjustment for the received non-infrared image information; blending the intensity-adjusted infrared image information and the intensity-adjusted non-infrared image information to obtain a merged image information; and providing the merged image information for determining a depth map.

In accordance with some embodiments, a method for processing an image includes: receiving infrared image information for a three-dimensional area; receiving non-infrared image information for the same three-dimensional area; performing nonlinear intensity adjustment for the received infrared image information; performing nonlinear intensity adjustment for the received non-infrared image information; blending the intensity-adjusted infrared image information and the intensity-adjusted non-infrared image information to obtain a merged image information; and providing the merged image information for determining a depth map.

In accordance with some embodiments, a computer readable storage medium stores instructions, which, when executed by one or more processors of an electronic device, cause the electronic device to: receive infrared image information for a three-dimensional area; receive non-infrared image information for the same three-dimensional area; perform nonlinear intensity adjustment for the received infrared image information; perform nonlinear intensity adjustment for the received non-infrared image information; blend the intensity-adjusted infrared image information and the intensity-adjusted non-infrared image information to obtain a merged image information; and provide the merged image information for determining a depth map.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
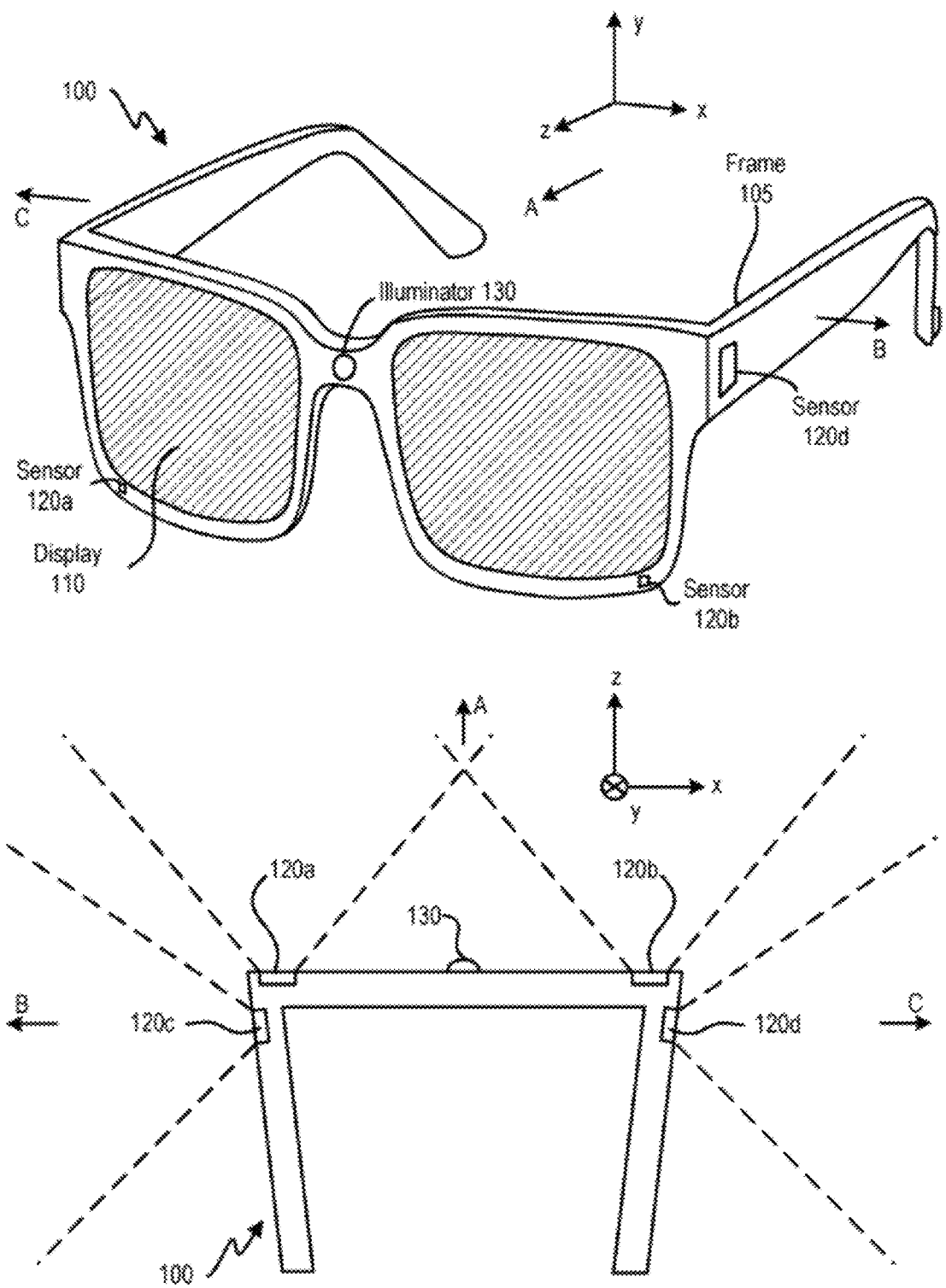
FIGS. 1A and 1B are diagrams of an example of a near-eye display in accordance with some embodiments.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

In some cases, depth sensing involves determining a depth (or a depth map) from one or more images. The images are collected using an image sensor.

A typical image sensor includes an array of pixel cells. Each pixel cell includes a photodiode to measure the intensity of incident light by converting photons into charge (e.g., electrons or holes). The charge generated by the photodiode can be converted to a voltage by a charge sensing unit, which can include a floating drain node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, light within a visible wavelength range can be used for 2D sensing, whereas light outside the visible wavelength range (e.g., infrared light) can be used for 3D sensing. An image sensor may include an optical filter array to allow light of different visible wavelength ranges and colors (e.g., red, green, blue, monochrome, etc.) to reach a first set of pixel cells assigned for 2D sensing, and to allow light of the invisible wavelength range to a second set of pixel cells assigned for 3D sensing.

To perform 2D sensing, a photodiode of a pixel cell can generate charge at a rate that is proportional to an intensity of visible light component (e.g., red, green, blue, monochrome, etc.) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an analog-to-digital converter (ADC) to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infrared light) can be projected onto an object, and the reflected light can be detected by the pixel cells. The light can include structured light, light pulses, etc. The outputs from the pixel cells can be used to perform depth sensing operations based on, for example, detecting patterns of the reflected structured light, measuring a time-of-flight of the light pulse, etc. To detect patterns of the reflected structured light, a distribution of quantities of charge generated by the pixel cells during the exposure time can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, a subset (e.g., a first set) of the pixel cells within the array can detect visible components of light to perform 2D sensing of the scene, and another subset (e.g., a second set) of the pixel cells within the array can detect an infrared component of the light to perform 3D sensing of the scene. The fusion of 2D and 3D imaging data are useful for many applications that provide virtual-reality (VR), augmented-reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, a subset of pixel cells within a pixel cell array can perform 3D sensing to, for example, identify a set of physical objects in the environment and determine the distances between the physical objects and the user. Another subset of pixel cells within the pixel cell array can perform 2D sensing to, for example, capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

To improve the correlation of 2D and 3D image data, an array of pixel cells can be configured to provide collocated imaging of different components of incident light from a spot of a scene. Specifically, each pixel cell can include a plurality of photodiodes, and a plurality of corresponding charge sensing units. Each photodiode of the plurality of photodiodes is configured to convert a different light component of incident light to charge. To enable the photodiodes to receive different light components of the incident light, the photodiodes can be formed in a stack which provides different absorption distances for the incident light for different photodiodes, or can be formed on a plane under an array of optical filters. Each charge sensing unit includes one or more capacitors to sense the charge of the corresponding photodiode by converting the charge to a voltage, which can be quantized by an ADC to generate a digital representation of an intensity of an incident light component converted by each photodiode. The ADC includes a comparator. As part of a quantization operation, the comparator can compare the voltage with a reference to output a decision. The output of the comparator can control when a memory stores a value from a free-running counter. The value can provide a result of quantizing the voltage.

There are various performance metrics of an image sensor, such as dynamic range, power, frame rate, etc. The dynamic range can refer to a range of light intensity measurable by the image sensor. For dynamic range, the upper limit can be defined based on the linearity of the light intensity measurement operation provided by the image sensor, whereas the lower limit can be defined based on the noise signals (e.g., dark charge, thermal noise, etc.) that affect the light intensity measurement operation. On the other hand, various factors can affect the frame rate, which can refer to the amount of time it takes for the image sensor to generate an image frame. The factors may include, for example, the time of completion of the quantization operation, various delays introduced to the quantization operation, etc.

To increase the dynamic range of the light intensity measurement operation, the ADC can quantize the voltages based on different quantization operations associated with different intensity ranges. Specifically, each photodiode can generate a quantity of charge within an exposure period, with the quantity of charge representing the incident light intensity. Each photodiode also has a quantum well to store at least some of the charge as residual charge. The quantum well capacity can be set based on a bias voltage on the switch between the photodiode and the charge sensing unit. For a low light intensity range, the photodiode can store the entirety of the charge as residual charge in the quantum well. In a PD ADC quantization operation, the ADC can quantize a first voltage generated by the charge sensing unit from sensing a quantity of the residual charge to provide a digital representation of the low light intensity. As the residual charge is typically much less susceptible to dark current in the photodiode, the noise floor of the low light intensity measurement can be lowered, which can further extend the lower limit of the dynamic range.

Moreover, for a medium light intensity range, the quantum well can be saturated by the residual charge, and the photodiode can transfer the remaining charge as overflow charge to the charge sensing unit, which can generate a second voltage from sensing a quantity of the overflow charge. In a FD ADC quantization operation, the ADC can quantize the second voltage to provide a digital representation of the medium light intensity. For both low and medium light intensities, the one or more capacitors in the charge sensing unit are not yet saturated, and the magnitudes of the first voltage and second voltage correlate with the light intensity. Accordingly for both low and medium light intensities, the comparator of the ADC can compare the first voltage or second voltage against a ramping voltage to generate a decision. The decision can control the memory to store a counter value which can represent a quantity of residual charge or overflow charge.

For a high light intensity range, the overflow charge can saturate the one or more capacitors in the charge sensing unit. As a result, the magnitudes of the second voltage no longer tracks the light intensity, and non-linearity can be introduced to the light intensity measurement. To reduce the non-linearity caused by the saturation of the capacitors, the ADC can perform a time-to-saturation (TTS) measurement operation by comparing the second voltage with a static threshold to generate a decision, which can control the memory to store a counter value. The counter value can represent a time when the second voltage reaches a saturation threshold. The time-to-saturation can represent the intensity of light in a range where the charge sensing unit is saturated and the value second voltage no longer reflects the intensity of light. With such arrangements, the upper limit of the dynamic range can be extended.

On the other hand, the operational speed of the image sensor can be improved based on various techniques, such as reducing the total time of completion of the quantization operations for all the photodiodes of a pixel cell, especially in a case where multiple quantization operations are performed on the charge generated by a photodiode to improve dynamic range, as described above. One way to reduce the total time of completion of the quantization operations is to enable parallel quantization operations for each photodiode by, for example, providing a comparator for each photodiode in a pixel cell, such that each photodiode of the pixel cell has its own dedicated comparator to perform the multiple quantization operations.

While including multiple comparators in each pixel cell of an image sensor can reduce the total time of completion of the quantization operations for each pixel cell and improve the operational speed of the image sensor, such arrangements can substantially increase the power consumption and the size of the pixel cell, both are which are undesirable especially for a wearable application. Specifically, the comparator typically comprises analog circuits (e.g., differential pairs, biasing circuits, output stages, etc.) which consume lots of static current. Moreover, those analog circuits typically use transistor devices that are of a different process node from the digital circuits and the photodiode devices of the pixel cell, and occupy far more spaces than the digital circuits and the photodiode devices. As the advancement in the process technologies further shrinks the sizes of the photodiodes and allows more photodiodes to be included in an image sensor to improve resolution, the power and space required by the comparators can become a bottleneck that limits how many photodiodes can be included in the image sensor, especially in a case where each photodiode is to have a dedicated comparator.

Besides parallelizing the quantization operations for each photodiode in a pixel cell, another way to improve the operational speed of the image sensor is by reducing the various delays introduced to the quantization operation. One source of delay can be the time for moving the quantization results (e.g., pixel data) out of the image sensor to a host device of the application that consumes the quantization results. For example, a subsequent quantization operation may be put on hold to wait for the quantization results of a previous quantization operation to be transferred to the host device. The operation speed of the image sensor can be improved if the hold time of the subsequent quantization operation can be reduced or minimized.

This disclosure relates to an image sensor that can provide improved collocated 2D and 3D imaging operations, as well as improved global shutter operations, by addressing at least some of the issues above. Specifically, an image sensor may include a first photodiode, a second photodiode, a quantizer, a first memory bank, a second memory bank, and a controller. The first photodiode can generate a first charge in response to incident light, whereas the second photodiode can generate a second charge in response to the incident light. The quantizer includes a comparator and is shared between the first photodiode and the second photodiode. The controller can control the quantizer to perform a first quantization operation and a second quantization operation of the first charge to generate, respectively, a first digital output and a second digital output, the first quantization and the second quantization operations being associated with different intensity ranges, and store one of the first digital output or the second digital output in the first memory bank. Moreover, the controller can control the quantizer to perform a third quantization operation of the second charge to generate a third digital output, and 5 store the third digital output in the second memory bank. The third quantization operation is associated with different intensity ranges from at least one of the first or second quantization operations.

In one example, the image sensor may include a charge sensing unit shared between the first photodiode and the second photodiode, and the quantizer can quantize the output of the charge sensing unit. The charge sensing unit may include a capacitor to convert the first charge and the second charge to, respectively, a first voltage and a second voltage, which can be quantized by the quantizer. Specifically, within an exposure time, the controller can first connect the charge sensing unit to the first photodiode to receive a first overflow charge from the first photodiode as part of the first charge, while the first photodiode and the second photodiode 15 accumulate, respectively, the first residual charge (as part of the first charge) and the second residual charge (as part of the second charge). During the exposure period, the first overflow charge stored at the capacitor may develop the first voltage, and the quantizer can perform at least one of the TTS or the FD ADC operation on the first voltage to generate the first digital output.

After the exposure period ends, a PD ADC operation can be performed for the first photodiode, in which the first residual charge accumulated at the first photodiode is transferred to the charge sensing unit to obtain a new first voltage. The new first voltage can be quantized by the quantizer to generate the second digital output. Based on whether the capacitor of the charge sensing unit is saturated by the first overflow charge, and whether the first photodiode is saturated by the first residual charge, one of the first digital output (from either the TTS or the FD ADC operation) or the second digital output (from the PD ADC operation) can be stored in the first memory bank. After the PD ADC operation for the first photodiode completes, the controller can control the second photodiode to transfer the second residual charge to the charge sensing unit to generate the second voltage, and control the quantizer to perform a PD ADC operation on the second voltage to generate the third digital output. The third digital output can be stored in the second memory bank.

The first photodiode and the second photodiode can be part of the same pixel cell or of different pixel cells of the image sensor. The first photodiode and the second photodiode can be configured to detect different components of the incident light. In one example, the first photodiode can be configured to detect visible components of the incident light to generate pixel data for 2D imaging, whereas the second photodiode can be configured to detect infrared components of the incident light to generate pixel data for 3D imaging. The first memory bank can be part of a first memory for storing a 2D image frame, whereas the second memory bank can be part of a second memory for storing a 3D image frame.

The arrangements above can improve the performance and reduce the size and power of an image sensor. Specifically, by providing additional memory banks to store a 2D image frame and a 3D image frame generated from the completed quantization operations, the 2D and 3D image frames can be read out from the memory and transferred to the host device while the subsequent quantization operations for the next frame is underway. Compared with a case where a single memory bank is shared by multiple photodiodes, and the quantization of the output of one photodiode needs to be put on hold until the quantization result stored in the memory bank is read out and can be erased, the arrangements above can reduce the delay introduced to the quantization operations and can improve the operational speed of the image sensor. Moreover, by sharing the comparator between the photodiodes, the power and the size of the image sensor, which is typically dominated by the analog circuits of the comparator, can be reduced. On the other hand, given that the memory banks are typically implemented as digital circuits which occupy much less space and consume much less power than the comparator, including additional memory banks typically do not lead to substantial increase in size and power consumption of the image sensor, especially when the memory banks are fabricated with advanced process technologies.

The image sensor may include additional charge sensing units and additional memory banks, and the mapping between the photodiodes and the memory banks can vary based on different applications. In one example, the image sensor may include two pixel cells, each pixel cell including a pair of photodiodes and a charge sensing unit. The two charge sensing units (of the two pixel cells) can share the comparator. The first photodiode can be of the first pixel cell, whereas the second photodiode can be of the second pixel cell. The comparator can be first connected to the charge sensing unit of the first pixel cell to perform the TTS, FD ADC, and PD ADC operations for the first photodiode, and store the output of one of the operations at the first memory bank. The comparator can then be connected to the charge sensing unit of the second pixel cell to perform the FD ADC and PD ADC operations for the second photodiode, and store the output of one of the operations at the second memory bank. For the other photodiodes in the pixel cells, only PD ADC operations are performed, and the results of the PD ADC operations can be stored in the first and second memory banks after the outputs of the first and second photodiodes have been read out.

As another example, each pixel cell of the image sensor may include four photodiodes sharing a charge sensing unit, and the image sensor may include four memory banks. In some examples, the memory banks can be evenly distributed among the pixel cells, such as having two memory banks to store the outputs of the first pixel cell and the other two memory banks to store the outputs of the second pixel cell. In some examples, the memory banks can be preferentially assigned to store the outputs of a pixel cell based on, for example, the pixel cell being part of a region of interest and the outputs of the pixel cell need to be read out prior to other pixel cells to, for example, dynamically change the quantization operations of the other pixel cells, such as to set the exposure time of the other pixel cells, to enable/disable certain quantization operations of the other pixel cells, etc. As another example, multiple memory banks can be assigned to store the outputs of a photodiode. Such arrangements can be used to enable multiple sampling of the voltage at the charge sensing unit resulted from the accumulation of residual charge/overflow charge, which can improve the resolution of the quantization. In such an example, each of the memory banks can store a digital sample of the voltage, and the digital samples can be read averaged (or otherwise post-processed) to generate the digital output representing the residual charge/overflow charge.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infrared light, ultra-violet light, etc.), and can serve various purposes. For example, illuminator 130 may project light in a dark environment (or in an environment with low intensity of infrared light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
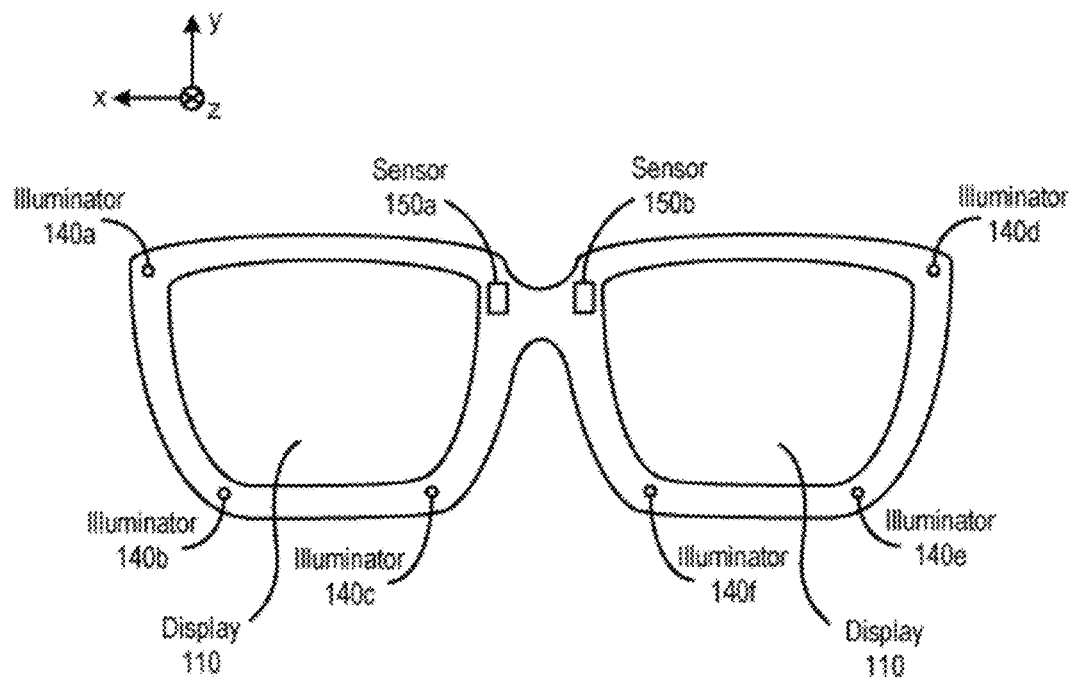
Figure 1B:
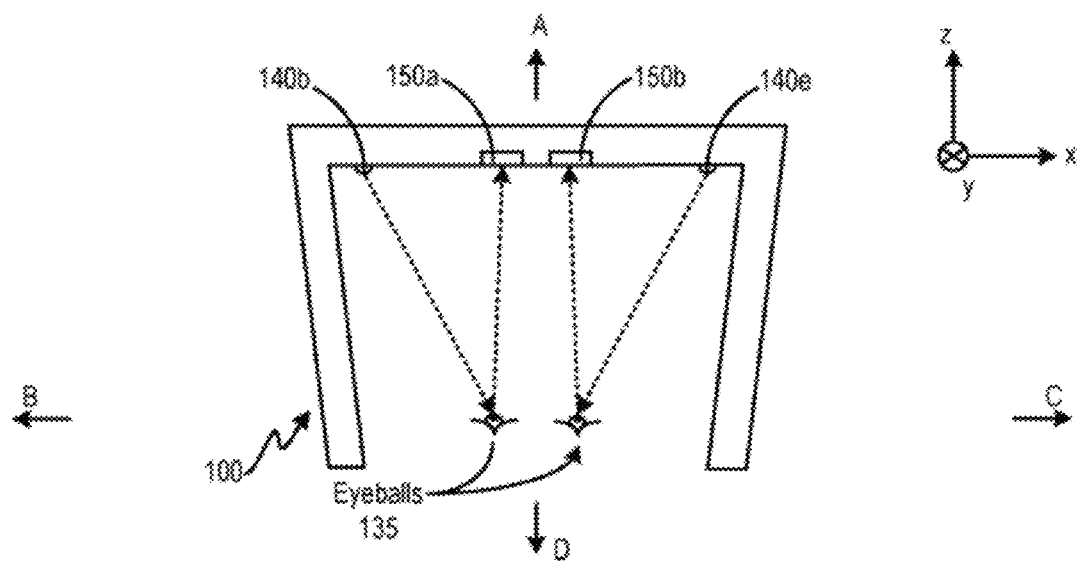

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 10 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
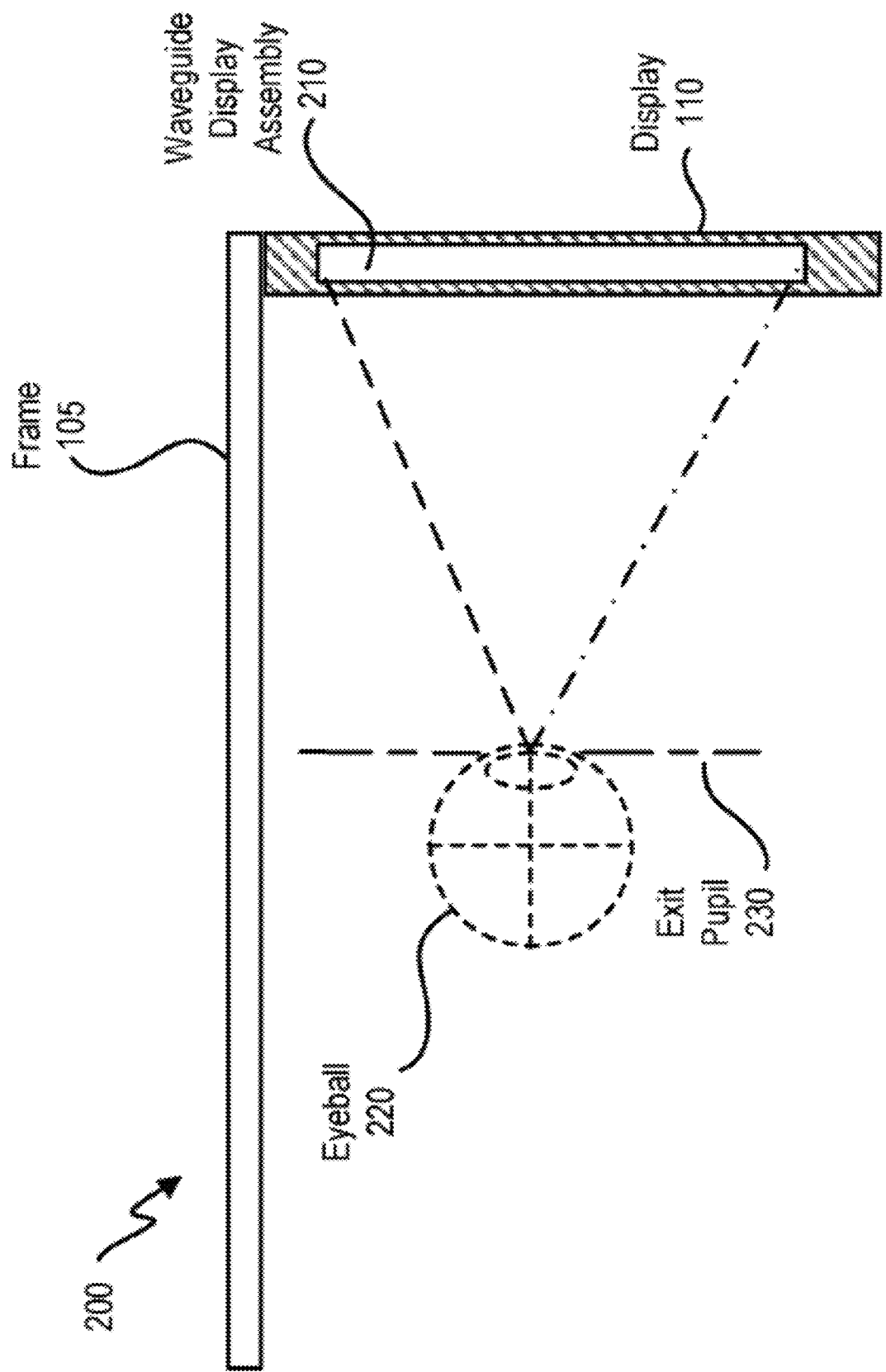
FIG. 2 is an example of a cross section of the near-eye display in accordance with some embodiments.

FIG. 2 is an example of a cross section 200 of near-eye display 100 illustrated in FIGS. 1A and 1B. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
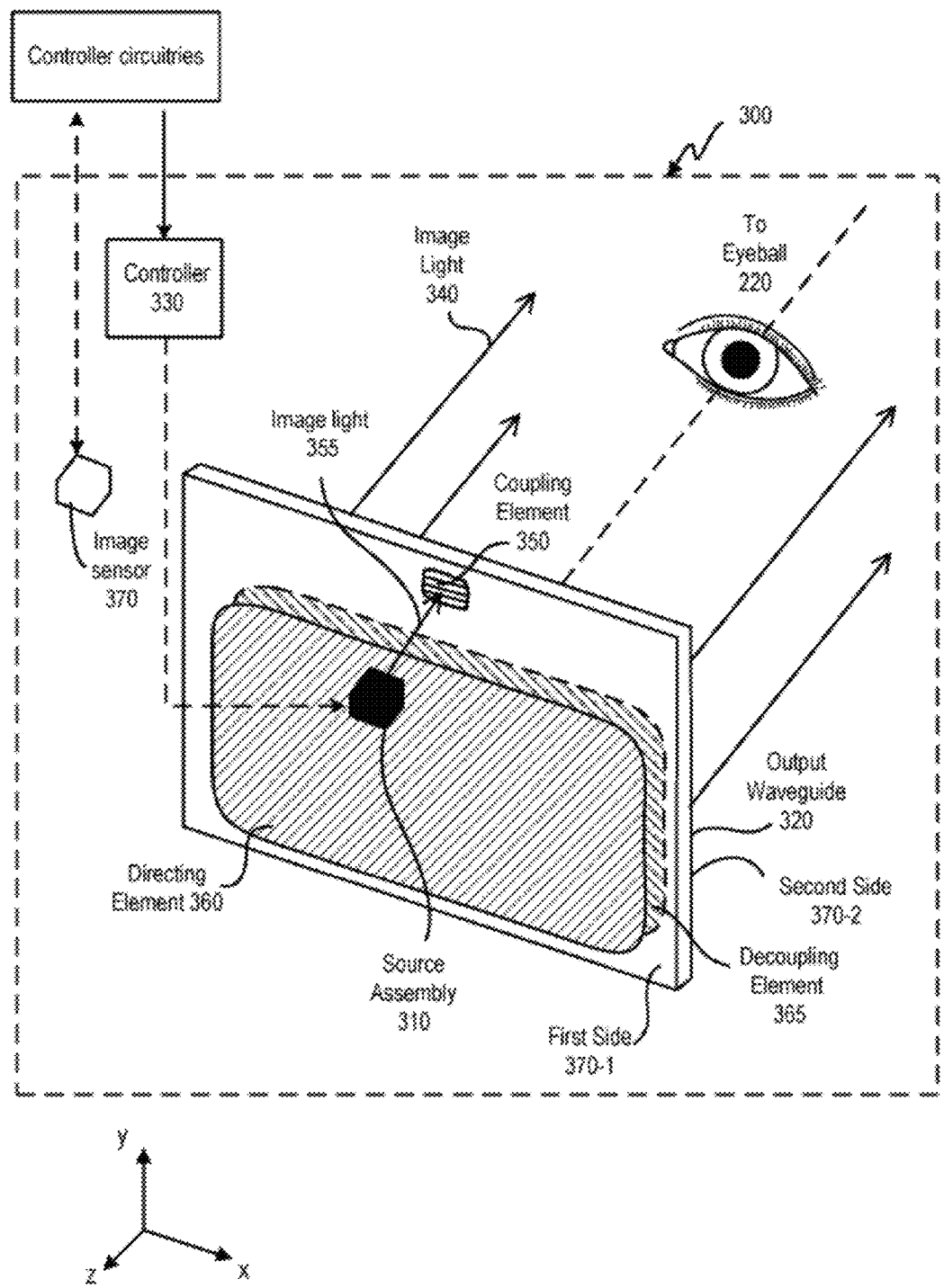
FIG. 3 illustrates an isometric view of an example of a waveguide display with a single source assembly in accordance with some embodiments.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 5 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
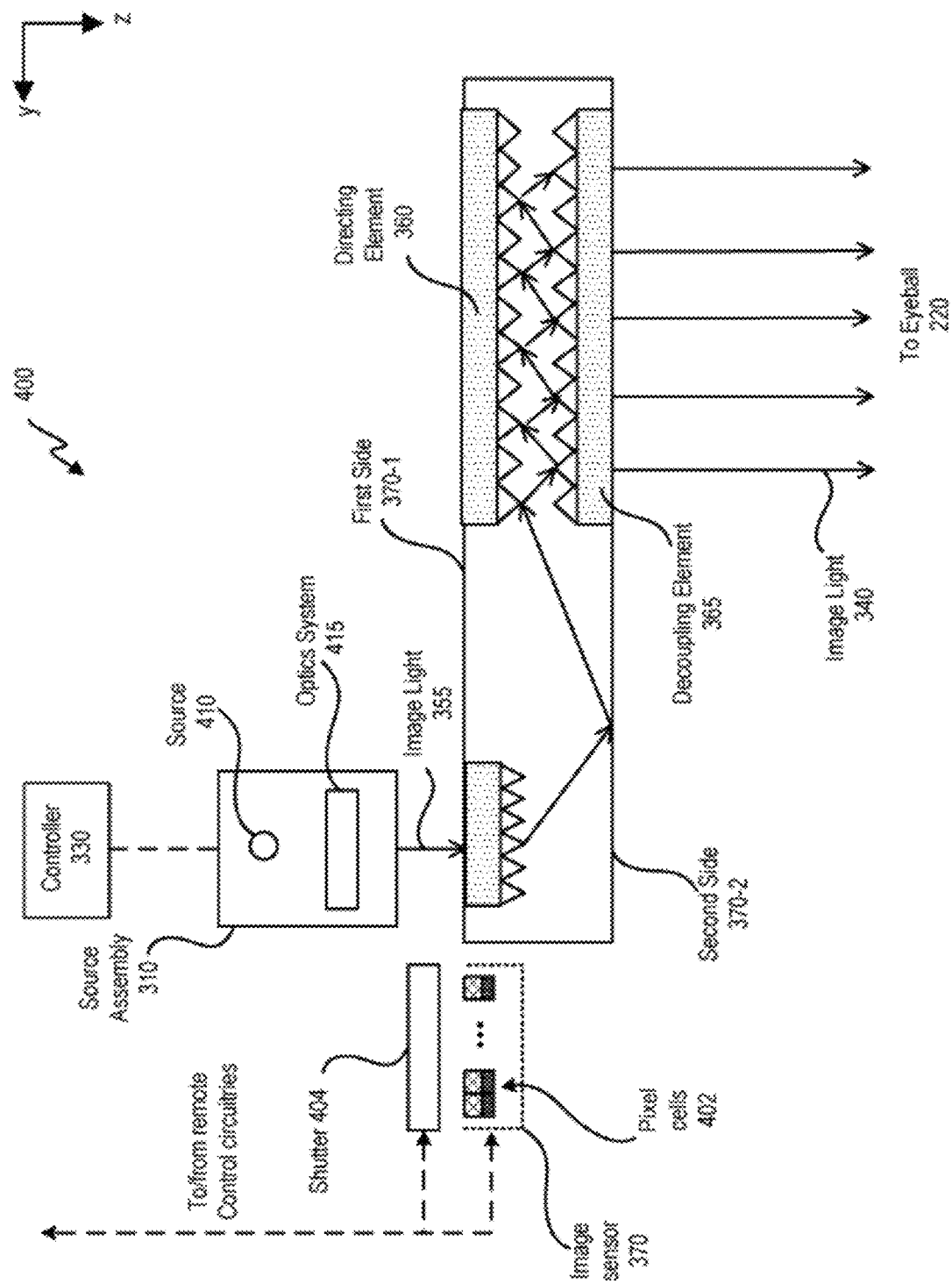
FIG. 4 illustrates a cross section of an example of the waveguide display in accordance with some embodiments.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5A:
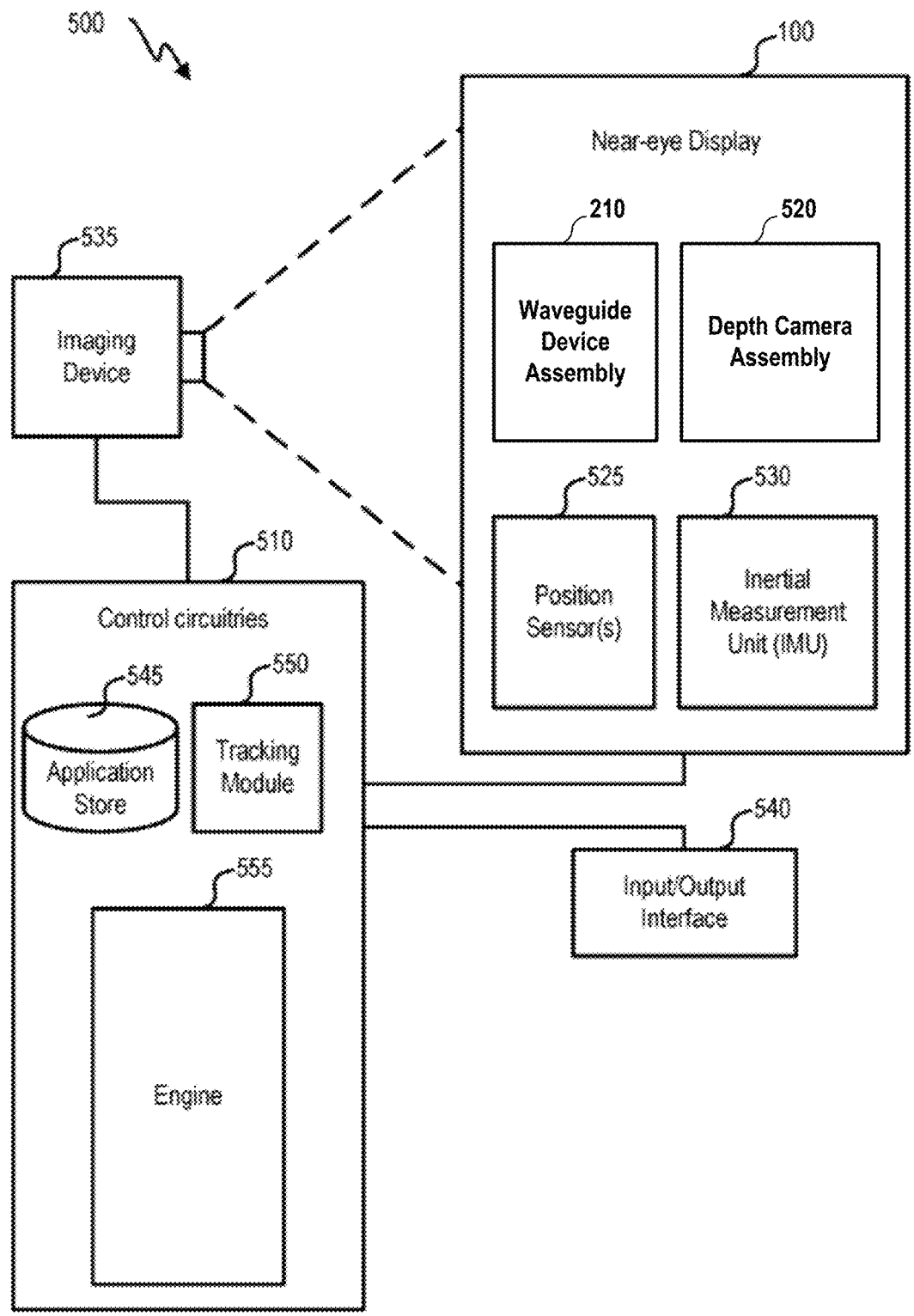
FIG. 5A is a block diagram of an example of a system including the near-eye display in accordance with some embodiments.

FIG. 5A is a block diagram of an example of a system 500 including the near-eye display 100. The system 500 comprises near-eye display 100, an imaging device 535, an input/output interface 540, and image sensors 120a-120d and 150a-150b that are each coupled to control circuits 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuits 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, depth camera assembly (DCA) 520, one or more position sensors 525, and/or an inertial measurement unit (IMU) 530. Some embodiments of the near-eye display 100 have different components than those described with respect to FIG. 5A. Additionally, the functionality provided by various components described with respect to FIG. 5A may be differently distributed among the components of the near-eye display 100 in other embodiments.

In some embodiments, waveguide display assembly 210 includes source assembly 310, output waveguide 320, and controller 330.

The DCA 120 captures data describing depth information of an area surrounding the near-eye display 100. Some embodiments of the DCA 120 include one or more imaging devices (e.g., a camera, a video camera) and an illumination source configured to emit a structured light (SL) pattern. As further discussed below, structured light projects a specified pattern, such as a symmetric or quasi-random dot pattern, grid, or horizontal bars, onto a scene. For example, the illumination source emits a grid or a series of horizontal bars onto an environment surrounding the near-eye display 100. Based on triangulation, or perceived deformation of the pattern when projected onto surfaces, depth and surface information of objects within the scene is determined.

In some embodiments, to better capture depth information of the area surrounding the near-eye display 100, the DCA 120 also captures time of flight information describing times for light emitted from the illumination source to be reflected from objects in the area surrounding the near-eye display 100 back to the one or more imaging devices. In various implementations, the DCA 120 captures time-of-flight information simultaneously or near-simultaneously with structured light information. Based on the times for the emitted light to be captured by one or more imaging devices, the DCA 120 determines distances between the DCA 120 and objects in the area surrounding the near-eye display 100 that reflect light from the illumination source. To capture time of flight information as well as structured light information, the illumination source modulates the emitted SL pattern with a carrier signal having a specific frequency, such as 30 MHz (in various embodiments, the frequency may be selected from a range of frequencies between 5 MHz and 5 GHz).

The imaging devices capture and record particular ranges of wavelengths of light (e.g., "bands" of light). Example bands of light captured by an imaging device include: a visible band (~380 nm to 750 nm), an infrared (IR) band (~750 nm to 2,200 nm), an ultraviolet band (100 nm to 380 nm), another portion of the electromagnetic spectrum, or some combination thereof. In some embodiments, an imaging device captures images including light in the visible band and in the infrared band. To jointly capture light from the structured light pattern that is reflected from objects in the area surrounding the near-eye display 100 and determine times for the carrier signal from the illumination source to be reflected from objects in the area to the DCA 120, the imaging device includes a detector comprising an array of pixel groups. Each pixel group includes one or more pixels, and different pixel groups are associated with different phase shifts relative to a phase of the carrier signal. In various embodiments, different pixel groups are activated at different times relative to each other to capture different temporal phases of the pattern modulated by the carrier signal emitted by the illumination source. For example, pixel groups are activated at different times so that adjacent pixel groups capture light having approximately a 90, 180, or 270 degree phase shift relative to each other. The DCA 120 derives a phase of the carrier signal, which is equated to a depth from the DCA 120, from signal data captured by the different pixel groups. The captured data also generates an image frame of the spatial pattern, either through summation of the total pixel charges across the time domain, or after correct for the carrier phase signal.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuits 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuits 510. An action request is a request to perform a particular action. For example, an action request may be to start or end an application or to perform a particular action within the application.

Control circuits 510 provide media to near-eye display 100 for presentation to the user in accordance with information received from one or more of: imaging device 535, near-eye display 100, and input/output interface 540. In some examples, control circuits 510 can be housed within system 500 configured as a head-mounted device. In some examples, control circuits 510 can be a standalone console device communicatively coupled with other components of system 500. In the example shown in FIG. 5, control circuits 510 include an application store 545, a tracking module 550, and an engine 555.

The application store 545 stores one or more applications for execution by the control circuits 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 5B:
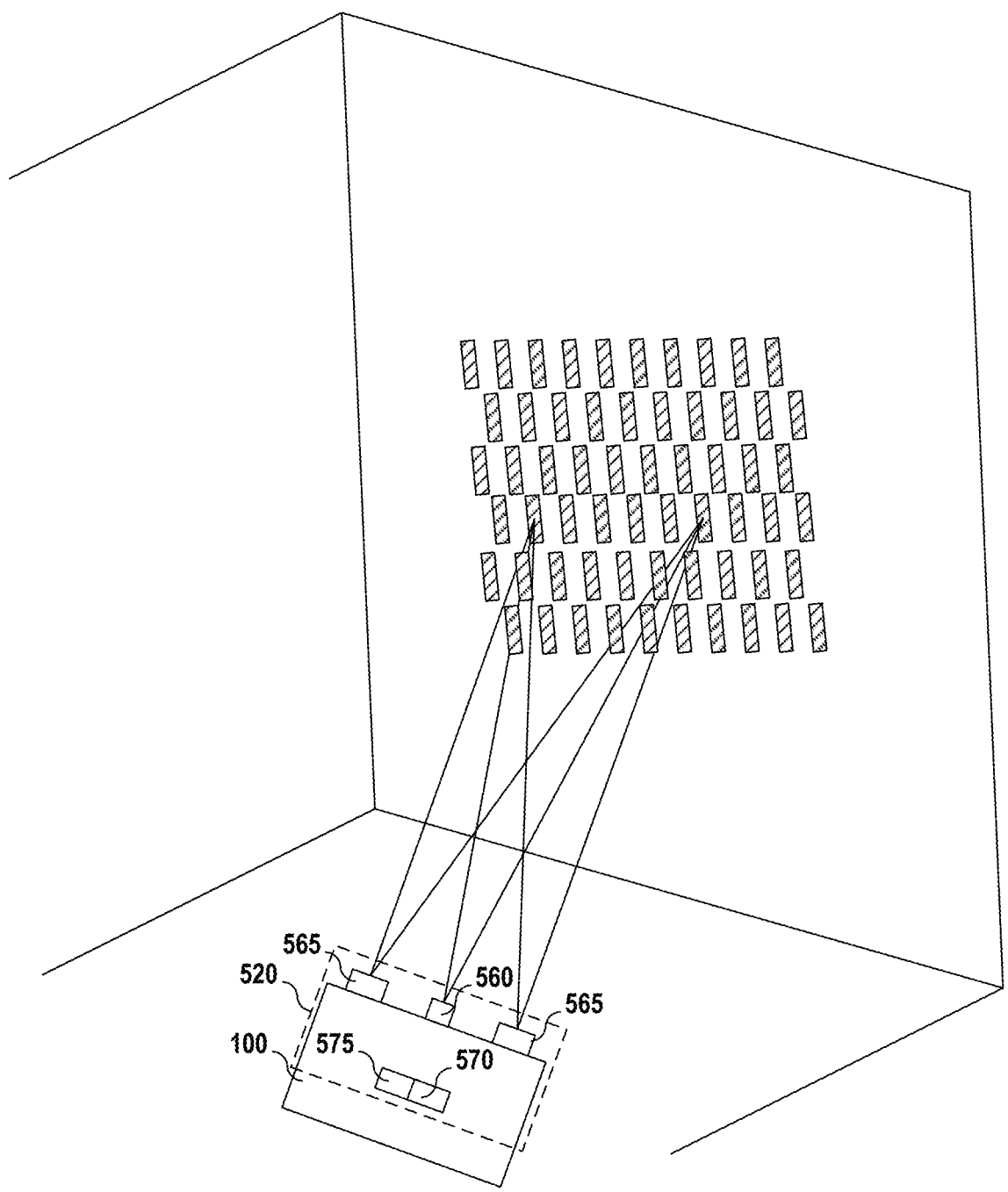
FIG. 5B is a schematic diagram illustrating imaging device and an illumination source for stereoscopic imaging, in accordance with some embodiments.

FIG. 5B shows an example arrangement of one or more imaging device 565 (e.g., two imaging devices 565 for stereoscopic measurements) and an illumination source 560 of the DCA 520, where the illumination source 560 projecting a structured light pattern (also referred to as a spatial pattern) onto a local area. In FIG. 5B, the example spatial pattern comprises a grid pattern projected within a field of view of the illumination source 560. Through scattered or direct reflection, the spatial pattern is captured by the imaging devices 565. In some embodiments, the captured spatial pattern is stored in memory 570 of the DCA 520. One or more processors 575 of the DCA 520, through triangulation, determines the three-dimensional layout of the local area based on the captured image(s) of the projected structure light.

Figure 6A:
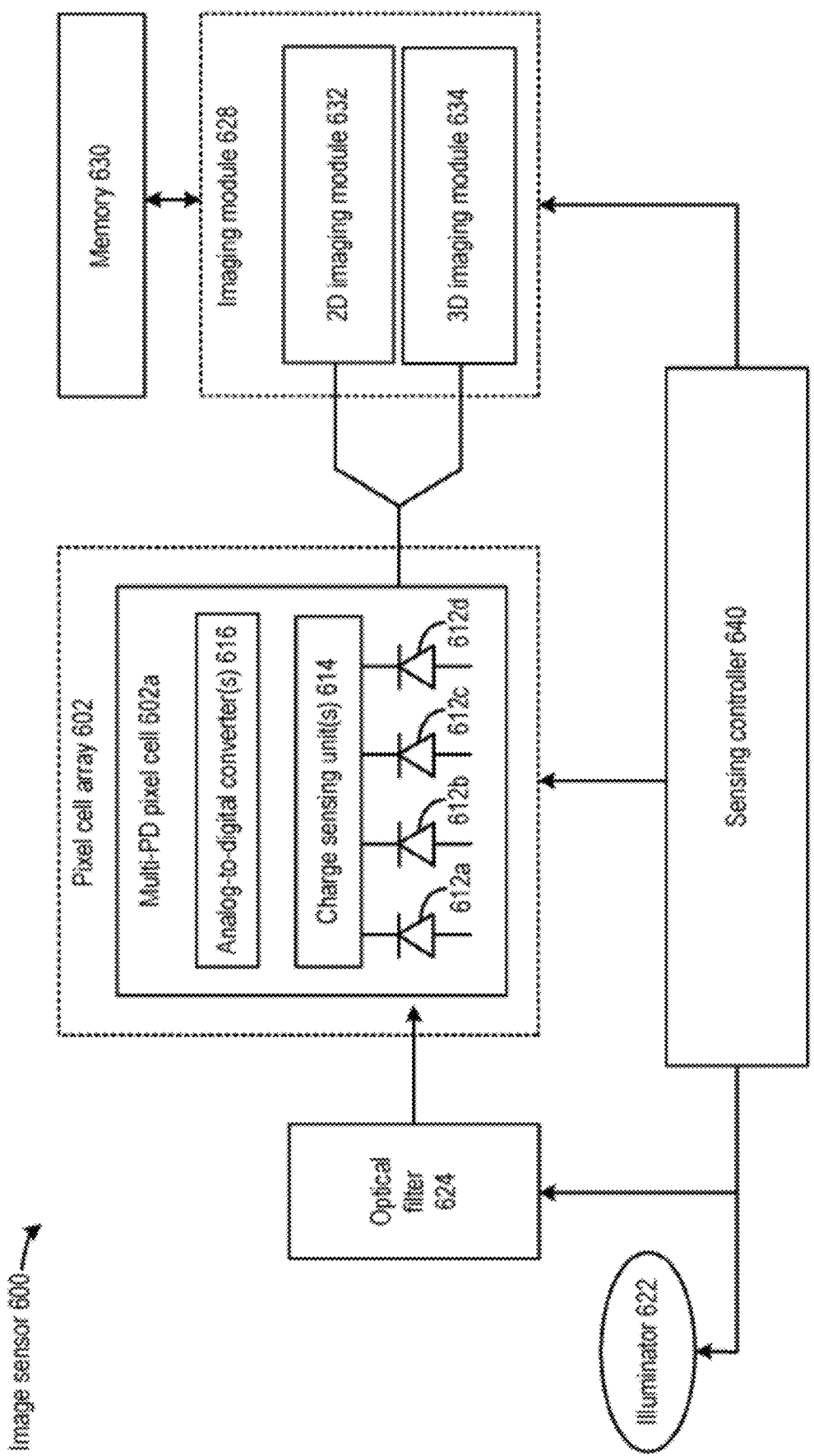
FIGS. 6A and 6B illustrate block diagrams of examples of an image sensor and a host device in accordance with some embodiments.

FIG. 6A illustrates an example of an image sensor 600. Image sensor 600 can be part of near-eye display 100, and can provide 2D and 3D image data to control circuits 510 of FIG. 5 to control the display content of near-eye display 100. As shown in FIG. 6A, image sensor 600 may include an array of pixel cells 602 including pixel cell 602a. Pixel cell 602a can include a plurality of photodiodes 612 including, for example, photodiodes 612a, 612b, 612c, and 612d, one or more charge sensing units 614, and one or more analog-to-digital converters 616. The plurality of photodiodes 612 can convert different components of incident light to charge. For example, photodiode 612a-612c can correspond to different visible light channels, in which photodiode 612a can convert a visible blue component (e.g., a wavelength range of 450-490 nanometers (nm)) to charge. Photodiode 612b can convert a visible green component (e.g., a wavelength range of 520-560 nm) to charge. Photodiode 612c can convert a visible red component (e.g., a wavelength range of 635-700 nm) to charge. Moreover, photodiode 612d can convert an infrared component (e.g., 700-1000 nm) to charge. Each of the one or more charge sensing units 614 can include a charge storage device and a buffer to convert the charge generated by photodiodes 612a-612d to voltages, which can be quantized by one or more ADCs 616 into digital values. The digital values generated from photodiodes 612a-612c can represent the different visible light components of a pixel, and each can be used for 2D sensing in a particular visible light channel. Moreover, the digital value generated from photodiode 612d can represent the infrared light component of the same pixel and can be used for 3D sensing. Although FIG. 6A shows that pixel cell 602a includes four photodiodes, it is understood that the pixel cell can include a different number of photodiodes (e.g., two, three, etc.).

In addition, image sensor 600 also includes an illuminator 622, an optical filter 624, an imaging module 628, and a sensing controller 640. Illuminator 622 may be an infrared illuminator, such as a laser, a light emitting diode (LED), etc., that can project infrared light for 3D sensing. The projected light may include, for example, structured light, light pulses, etc. Optical filter 624 may include an array of filter elements overlaid on the plurality of photodiodes 612a-612d of each pixel cell including pixel cell 606a. Each filter element can set a wavelength range of incident light received by each photodiode of pixel cell 606a. For example, a filter element over photodiode 612a may transmit the visible blue light component while blocking other components, a filter element over photodiode 612b may transmit the visible green light component, a filter element over photodiode 612c may transmit the visible red light component, whereas a filter element over photodiode 612d may transmit the infrared light component.

Image sensor 600 further includes an imaging module 628 and memory 630. Imaging module 628 may further include a 2D imaging module 632 to perform 2D imaging operations and a 3D imaging module 634 to perform 3D imaging operations. The operations can be based on digital values provided by ADCs 616. For example, based on the digital values from each of photodiodes 612a-612c, 2D imaging module 632 can generate an array of pixel values representing an intensity of an incident light component for each visible color channel, and generate an image frame for each visible color channel. Moreover, 3D imaging module 634 can generate a 3D image based on the digital values from photodiode 612d. In some examples, based on the digital values, 3D imaging module 634 can detect a pattern of structured light reflected by a surface of an object, and compare the detected pattern with the pattern of structured light projected by illuminator 622 to determine the depths of different points of the surface with respect to the pixel cells array. For detection of the pattern of reflected light, 3D imaging module 634 can generate pixel values based on intensities of infrared light received at the pixel cells. As another example, 3D imaging module 634 can generate pixel values based on time-of-flight of the infrared light transmitted by illuminator 622 and reflected by the object. Memory 630 can store at least some of the pixel data of the 2D and 3D images generated by, respectively, 2D imaging module 632 and 3D imaging module 634.

Figure 7A:
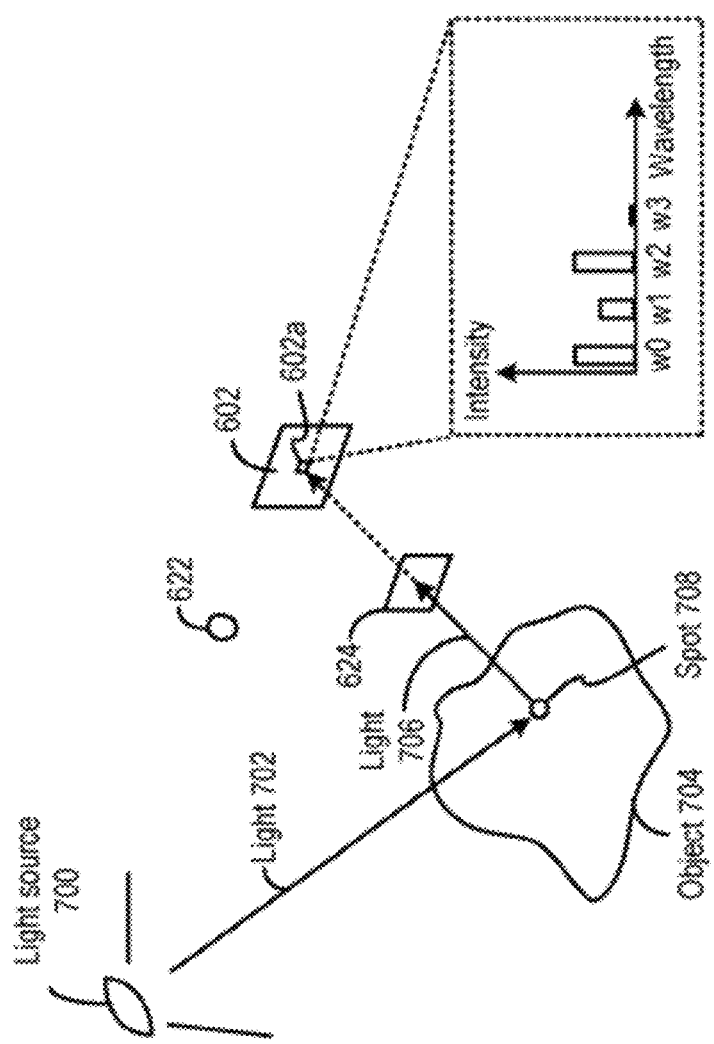
FIGS. 7A, 7B, and 7C illustrate operations for determining light intensities of different ranges by example image sensor of FIG. 6A.
Figure 7B:
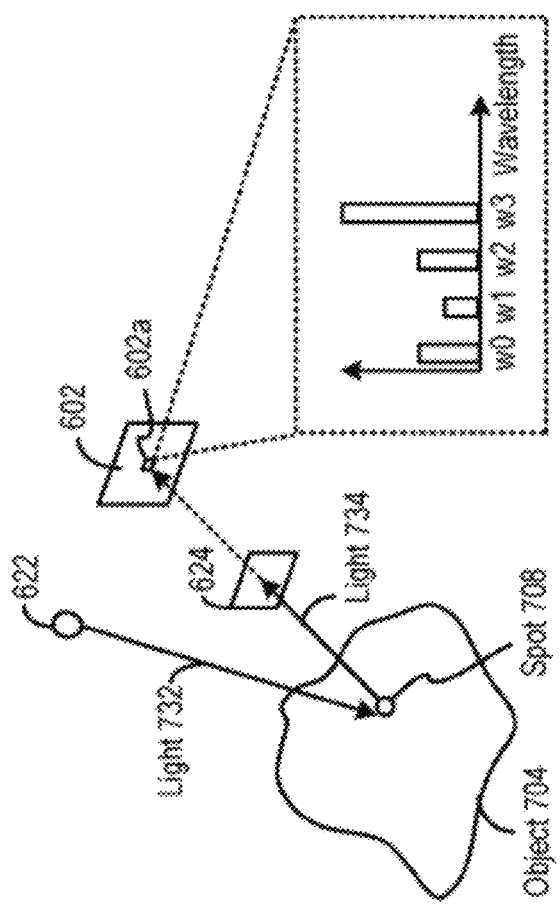
Figure 7C:
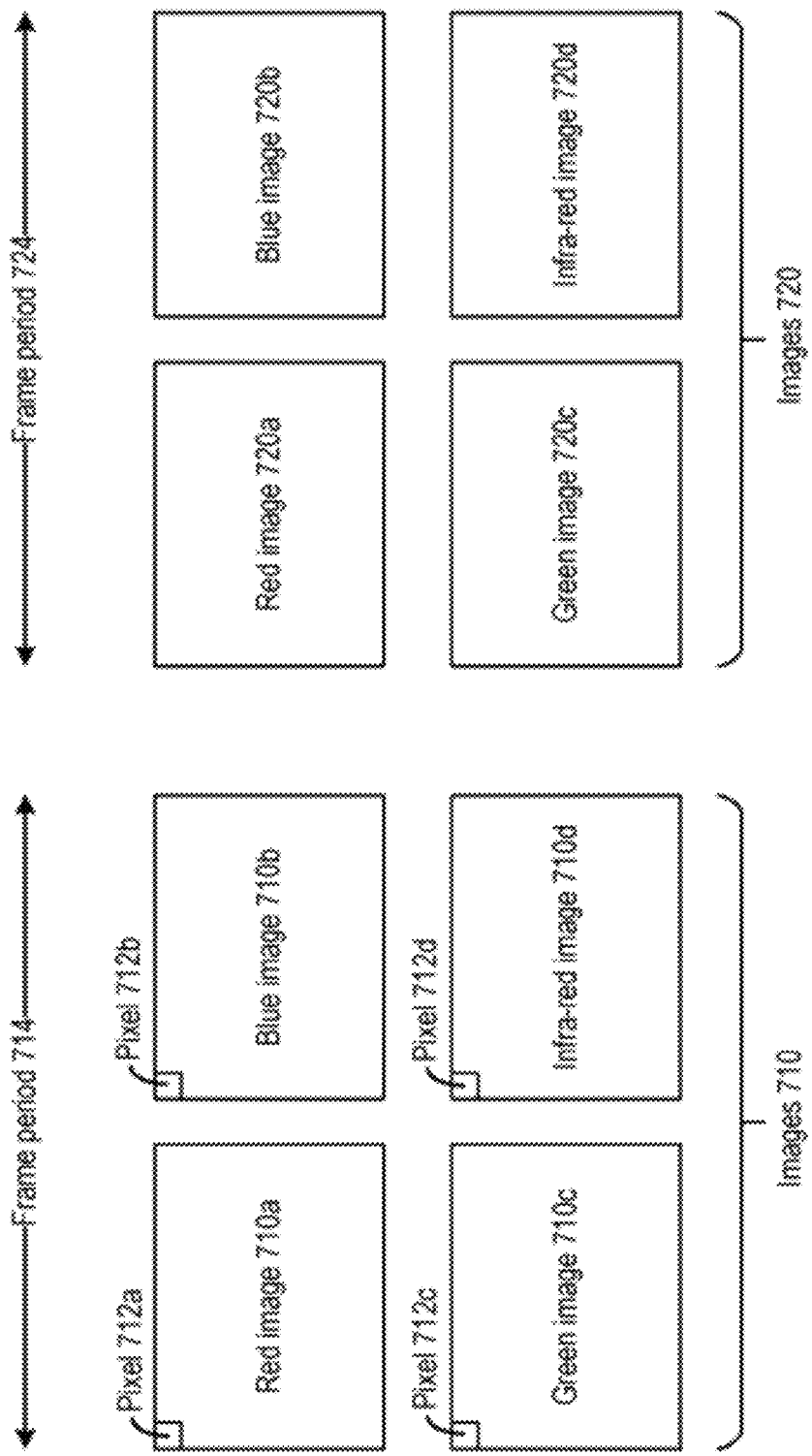

Image sensor 600 further includes a sensing controller 640 to control different components of image sensor 600 to perform 2D and 3D imaging of an object. Reference is now made to FIGS. 7A-7C, which illustrate examples of operations of image sensor 600 for 2D and 3D imaging. FIG. 7A illustrates an example of operations for 2D imaging. For 2D imaging, pixel cells array 602 can detect visible light in the environment including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can also include the ambient infrared light component. Visible light 706 can be filtered by optical filter array 624 to pass different components of visible light 706 of wavelength ranges w0, w1, w2, and w3 to, respectively, photodiodes 612a, 612b, 612c, and 612d of pixel cell 602a. Wavelength ranges w0, w1, w2, and w3 an correspond to, respectively, blue, green, red, and infrared. As shown in FIG. 7A, as the infrared illuminator 622 is not turned on, the intensity of infrared component (w3) is contributed by the ambient infrared light and can be very low. Moreover, different visible components of visible light 706 can also have different intensities. Charge sensing units 614 can convert the charge generated by the photodiodes to voltages, which can be quantized by ADCs 616 into digital values representing the red, blue, and green components of a pixel representing spot 708. Referring to FIG. 7C, after the digital values are generated, sensing controller 640 can control 2D imaging module 632 to generate, based on the digital values, sets of images including a set of images 710, which includes a red image frame 710a, a blue image frame 710b, and a green image frame 710c each representing one of red, blue, or green color image of a scene captured with the same frame period 714. Each pixel from the red image (e.g., pixel 712a), from the blue image (e.g., pixel 712b), and from the green image (e.g., pixel 712c) can represent visible components of light from the same spot (e.g., spot 708) of a scene. A different set of images 720 can be generated by 2D imaging module 632 in a subsequent frame period 724. Each of red image 710a, blue image 710b, and green image 710c can represent the scene in a specific color channel and can be provided to an application to, for example, extract image features from the specific color channel. As each image represents the same scene and each corresponding pixel of the images represent light from the same spot of the scene, the correspondence of images between different color channels can be improved.

Furthermore, image sensor 600 can also perform 3D imaging of object 704. Referring to FIG. 7B, sensing controller 610 can control illuminator 622 to project infrared light 732, which can include a light pulse, structured light, etc., onto object 704. Infrared light 732 can have a wavelength range of 700 nanometers (nm) to 1 millimeter (mm). Infrared light 734 can reflect off spot 708 of object 704 and can propagate towards pixel cells array 602 and pass through optical filter 624, which can provide the infrared component (of wavelength range w3) to photodiode 612d to convert to charge. Charge sensing units 614 can convert the charge to a voltage, which can be quantized by ADCs 616 into digital values. Referring to FIG. 7C, after the digital values are generated, sensing controller 640 can control 3D imaging module 634 to generate, based on the digital values, an infrared image 710d of the scene as part of images 710 captured within exposure period 714. As infrared image 710d can represent the same scene in the infrared channel and a pixel of infrared image 710d (e.g., pixel 712d) represents light from the same spot of the scene as other corresponding pixels (pixels 712a-712c) in other images within images 710, the correspondence between 2D and 3D imaging can be improved as well.

Figure 6B:
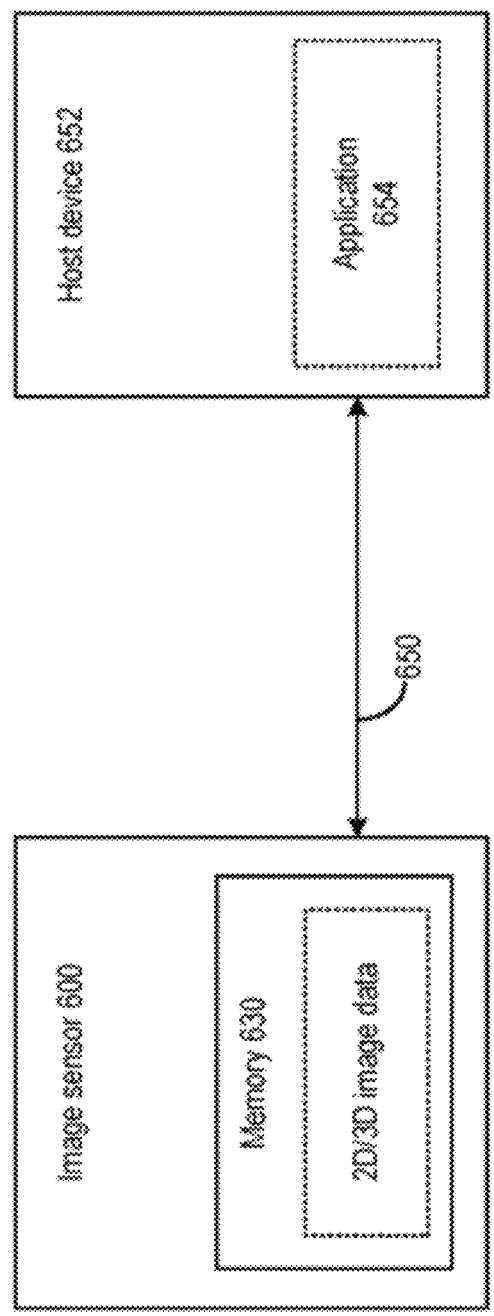

In some examples, as shown in FIG. 6B, image sensor 600 can be communicatively coupled, via an interconnect 650, with a host device 652 that hosts an application 654. Image sensor 600 and host device 652 can be part of a wearable VR/AR/MR system, whereas application 654 may perform a scene reconstruction of an environment in which the user of the system is located based on 2D and 3D image data provided by image sensor 600, and can generate display effects based on the reconstructed scene to provide an interactive experience. In some examples, interconnect 650 can be a serial interconnect compliant with the Camera Serial Interface (CSI) specification of the Mobile Industry Processor Interface (MIPI). Image sensor 600 can perform a readout of the 2D and/or 3D image data from memory 630 and transmit the 2D and 3D image data to host deice 652 via interconnect 650.

Figure 8A:
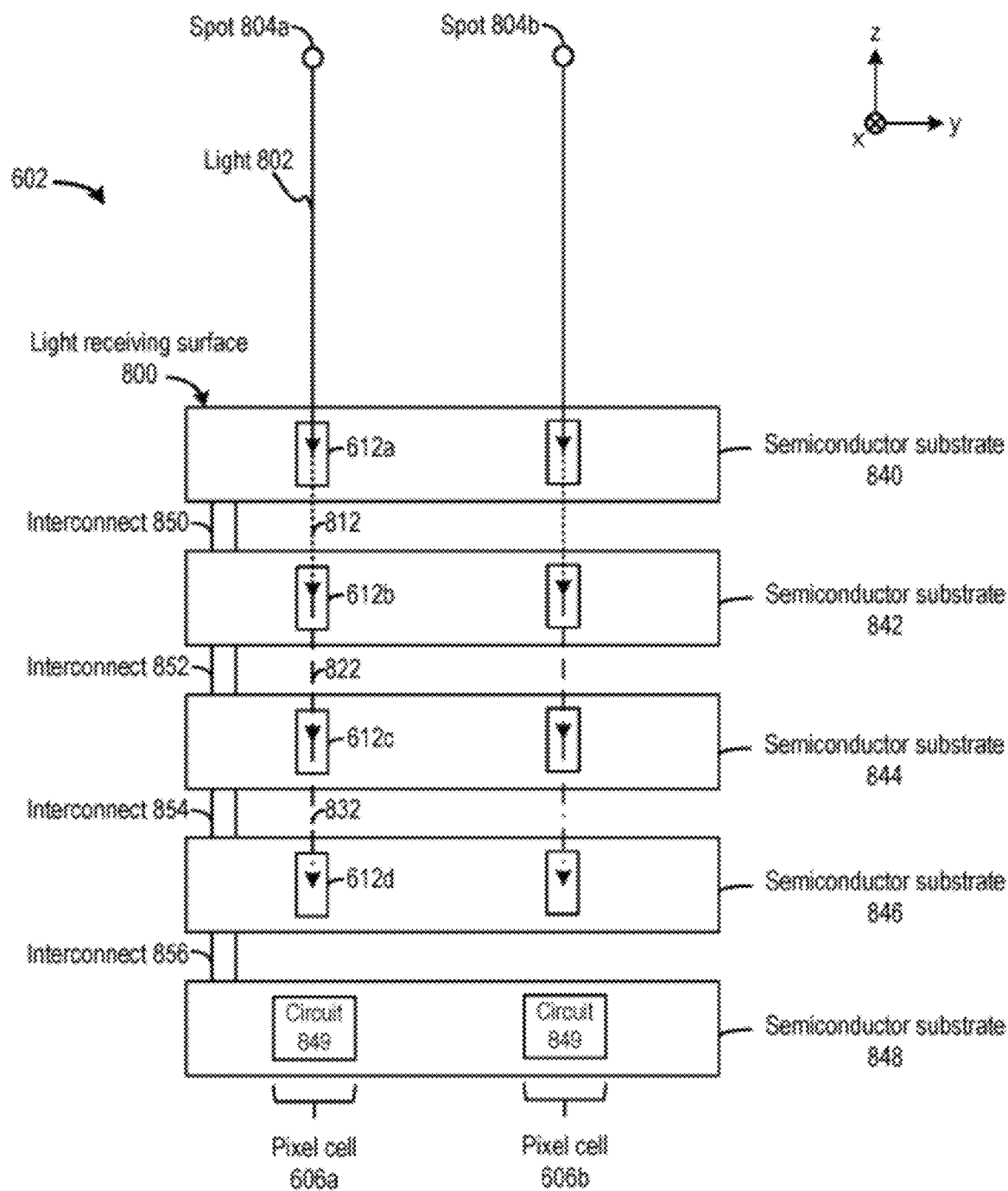
FIGS. 8A, 8B, 8C, and 8D illustrate examples of internal components of an example pixel cell of the example image sensor of FIG. 6A.

FIGS. 8A-8D illustrate examples of arrangements of photodiodes 612 in a pixel cell. As shown in FIG. 8A, the photodiodes 612a-612d in a pixel cell 602a can form a stack along an axis that is perpendicular to a light receiving surface 800 through which pixel cell 602a receives incident light 802 from a spot 804a. For example, the photodiodes 612a-612d can form a stack along a vertical axis (e.g., the z-axis) when the light receiving surface 800 is parallel with the x and y axes. Each photodiode can have a different distance from light receiving surface 800, and the distance can set the component of incident light 802 being absorbed and converted to charge by each photodiode. For example, photodiode 612a is closest to light receiving surface 800 and can absorb and convert the blue component to charge, which is of the shortest wavelength range among the other components. Light 812 includes the remaining components of light 802 (e.g., green, red, and infrared) and can propagate to photodiode 612b, which can absorb and convert the green component. Light 822 includes the remaining components of light 812 (e.g., red and infrared) and can propagate to photodiode 612c, which can absorb and convert the red component. The remaining infrared component 832 can propagate to photodiode 612d to be converted to charge.

Each the photodiodes 612a, 612b, 612c, and 612d can be in a separate semiconductor substrate, which can be stacked to form image sensor 600. For example, photodiode 612a can be in a semiconductor substrate 840, photodiode 612b can be in a semiconductor substrate 842, photodiode 612c can be in a semiconductor substrate 844, whereas photodiode 612d can be in a semiconductor substrate 846. Each semiconductor substrate can include other photodiodes of other pixel cells, such as pixel cells 602b to receive light from spot 804b. Image sensor 600 can include another semiconductor substrate 848 which can include pixel cell processing circuits 849 which can include, for example, charge sensing units 614, ADCs 616, etc. Each semiconductor substrate can be connected to a metal interconnect, such as metal interconnects 850, 852, 854, and 856 to transfer the charge generated at each photodiode to processing circuit 849.

Figure 8B:
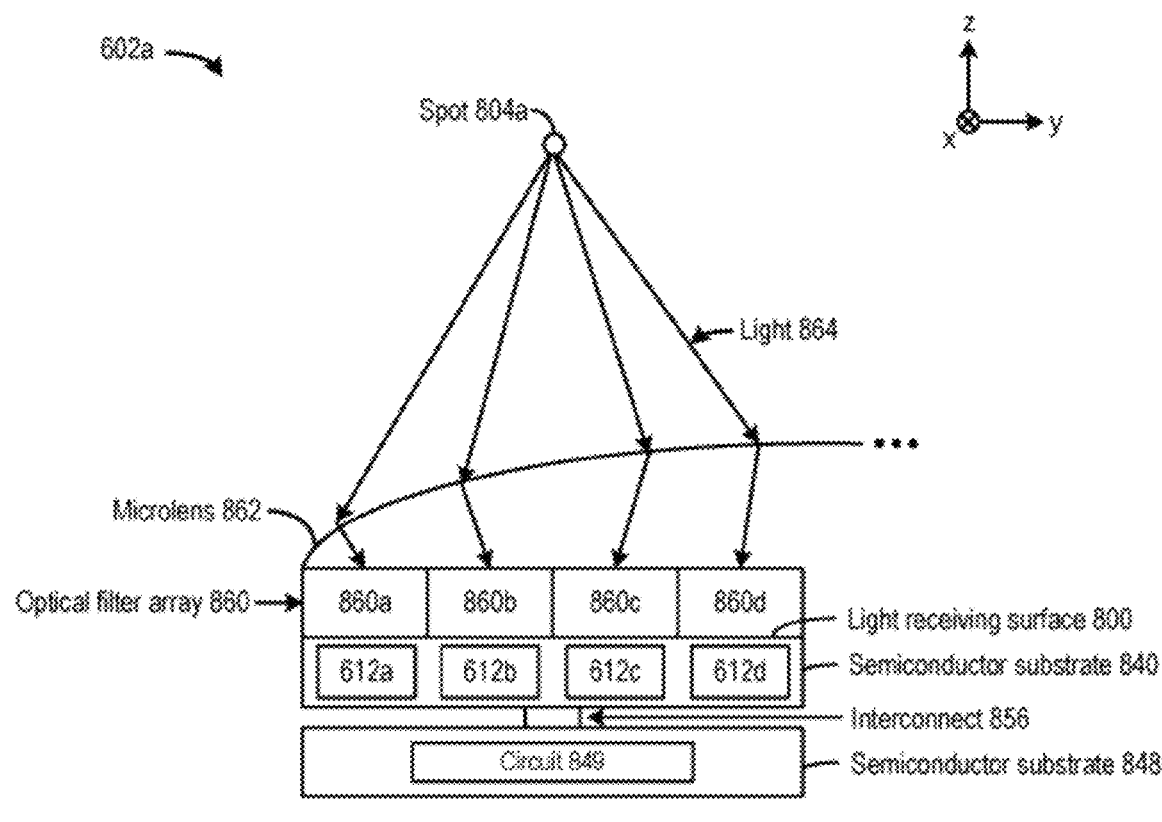
Figure 8B:
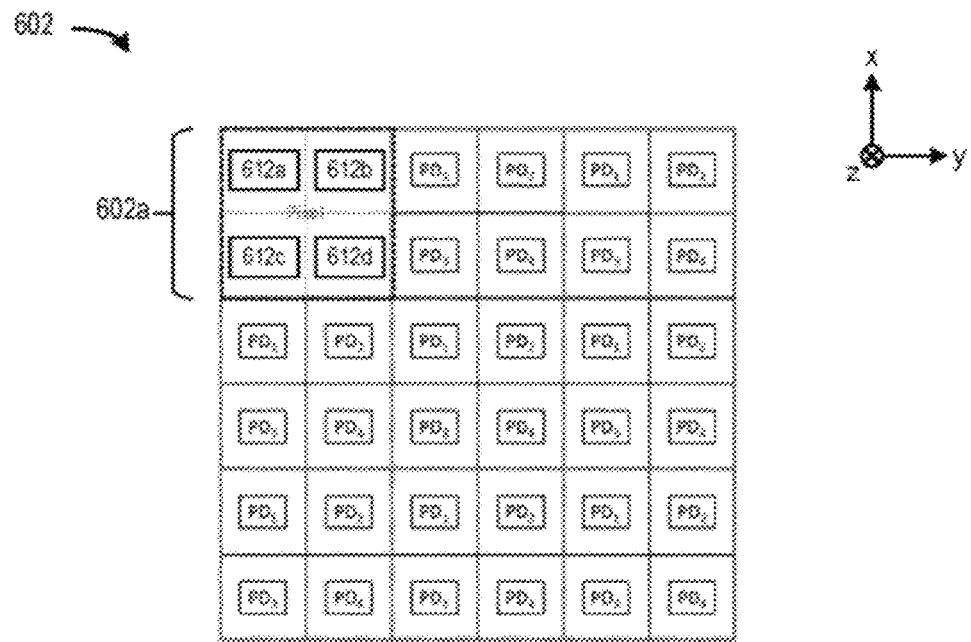
Figure 8C:
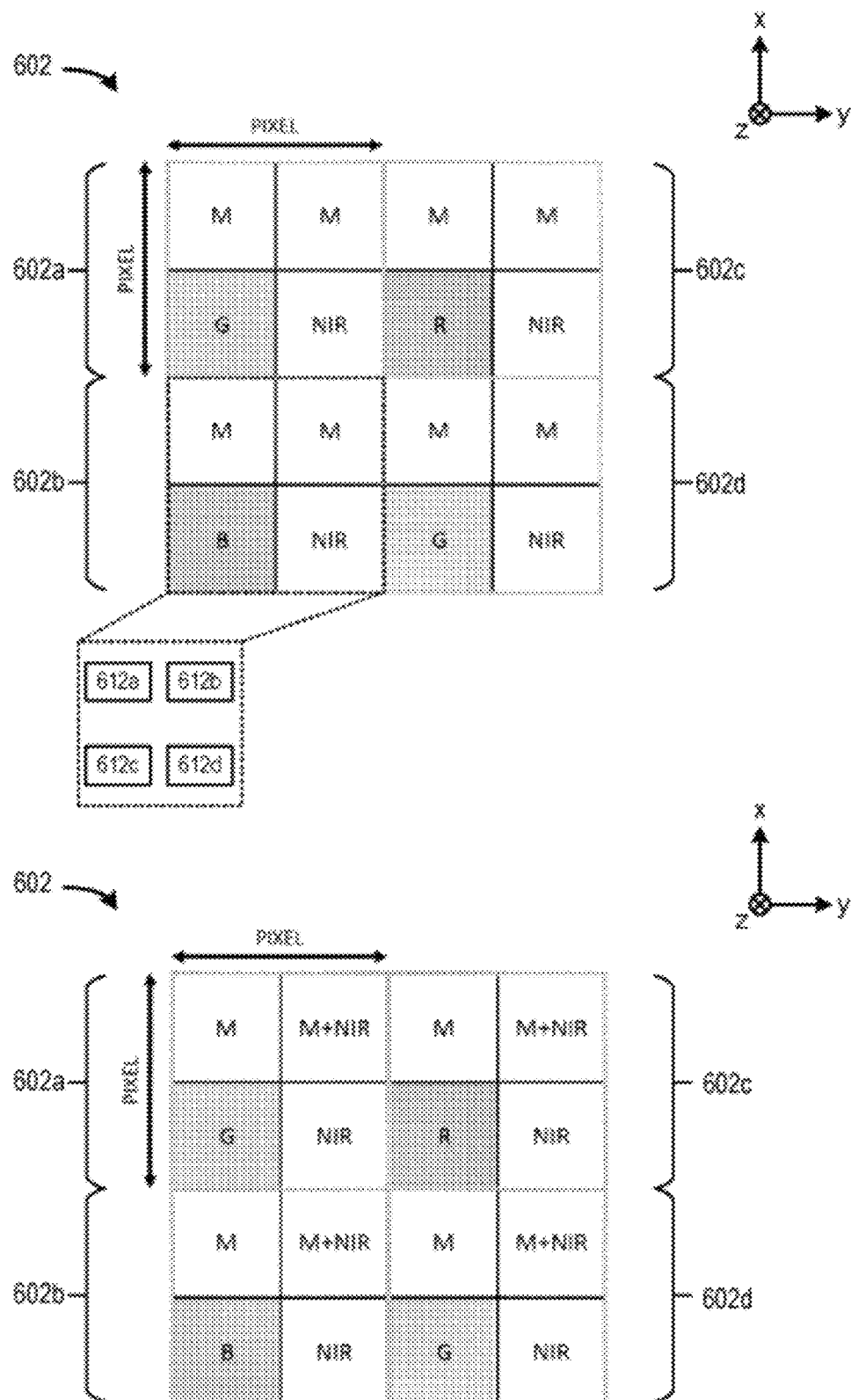
Figure 8D:
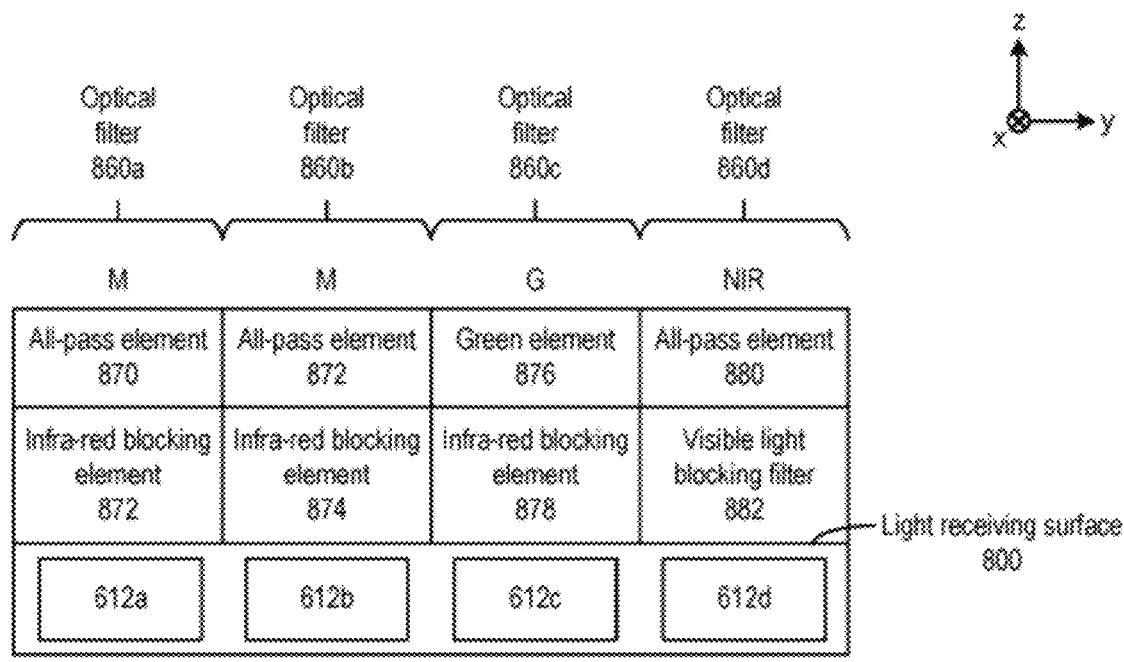
Figure 8D:
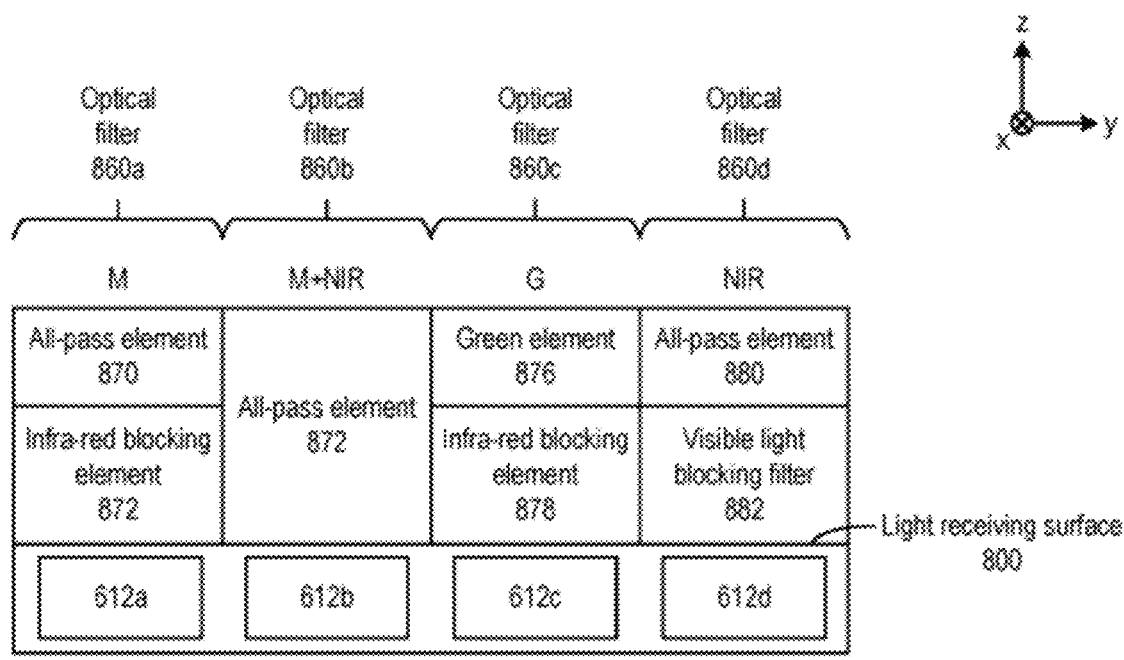

FIGS. 8B-8D illustrate other example arrangements of photodiodes 612. As shown in FIGS. 8B-8D, the plurality of photodiodes 612 can be arranged laterally parallel with light receiving surface 800. The top graph of FIG. 8B illustrates a side view of an example of pixel cell 602a, whereas the bottom graph of FIG. 8B illustrates a top view of pixel array 602 including pixel cell 602a. As shown in FIG. 8B, with light receiving surface 800 being parallel with the x and y axes, photodiodes 612a, 612b, 612c, and 612d can be arranged adjacent to each other also along the x and y axes in semiconductor substrate 840. Pixel cell 602a further includes an optical filter array 860 overlaid on the photodiodes. Optical filter array 860 can be part of optical filter 624. Optical filter array 860 can include a filter element overlaid on each of photodiodes 612a, 612b, 612c, and 612d to set a wavelength range of incident light component received by the respective photodiode. For example, filter element 860a is overlaid on photodiode 612a and can allow only visible blue light to enter photodiode 612a. Moreover, filter element 860b is overlaid on photodiode 612b and can allow only visible green light to enter photodiode 612b. Further, filter element 860c is overlaid on photodiode 612c and can allow only visible red light to enter photodiode 612c. Filter element 860d is overlaid on photodiode 612d and can allow only infrared light to enter photodiode 612d. Pixel cell 602a further includes one or more microlens 862 which can project light 864 from a spot of a scene (e.g., spot 804a) via optical tiler array 860 to different lateral locations of light receiving surface 800, which allows each photodiode to become a sub-pixel of pixel cell 602a and to receive components of light from the same spot corresponding to a pixel. Pixel cell 602a can also include semiconductor substrate 848 which can include circuit 849 (e.g., charge sensing units 614, ADCs 616, etc.) to generate digital values from the charge generated by the photodiodes. Semiconductor substrates 840 and 848 can form a stack and can be connected with interconnect 856.

The arrangements of FIG. 8B, in which the photodiodes are arranged laterally and an optical filter array is used to control the light components received by the photodiodes, can offer numerous advantages. For example, the number of stacks and the number of semiconductor substrates can be reduced, which not only reduce the vertical height but also the interconnects among the semiconductor substrates. Moreover, relying on filter elements rather than the propagation distance of light to set the wavelength ranges of the components absorbed by each photodiode can offer flexibilities in selecting the wavelength ranges. As shown in top graph of FIG. 8C, pixel cells array 602 can include different optical filter arrays 860 for different pixel cells. For example, each pixel cell of pixel cells array 602 can have an optical filter array that provides monochrome channel of a wavelength range of 380-740 nm (labelled with "M") for photodiodes 612a and 612b, and an infrared channel of a wavelength range of 700-1000 nm (labelled with "NIR") for photodiode 612d. But the optical filter arrays may also provide a different visible color channel for the different pixel cells. For example, the optical filter arrays 860 for pixel cells array 602a, 602b, 602c, and 602d may provide, respectively, a visible green channel (labelled with "G"), a visible red channel (labelled with "R"), a visible blue channel (labelled with "B"), and a visible green channel for photodiode 612c of the pixel cells arrays. As another example, as shown in the bottom graph of FIG. 8C, each optical filter array 860 can provide a monochrome and infrared channel (labelled "M+NIR") which spans a wavelength range of 380-1000 nm for photodiode 612b of each pixel cells array.

FIG. 8D illustrates examples of optical filter array 860 to provide the example channels shown in FIG. 8C. As shown in FIG. 8D, optical filter array 860 can include a stack of optical filters to select a wavelength range of light received by each photodiode within a pixel cell array. For example, referring to the top graph of FIG. 8D, optical filter 860a can include an all-pass element 870 (e.g., a transparent glass that passes both visible light and infrared light) and an infrared blocking element 872 forming a stack to provide a monochrome channel for photodiode 612a. Optical filter 860b can also include an all-pass element 874 and an infrared blocking element 876 to also provide a monochrome channel for photodiode 612b. Further, optical filter 860c can include a green-pass element 876 which passes green visible light (but reject other visible light component), and an infrared blocking element 878, to provide a green channel for photodiode 612c. Lastly, optical filter 860d can include an all-pass element 880 and a visible light blocking filter 882 (which can block out visible light but allows infrared light to go through) to provide an infrared channel for photodiode 612d. In another example, as shown in the bottom graph of FIG. 8D, optical filter 860b can include only all-pass element 872 to provide a monochrome and infrared channel for photodiode 612b.

Figure 9:
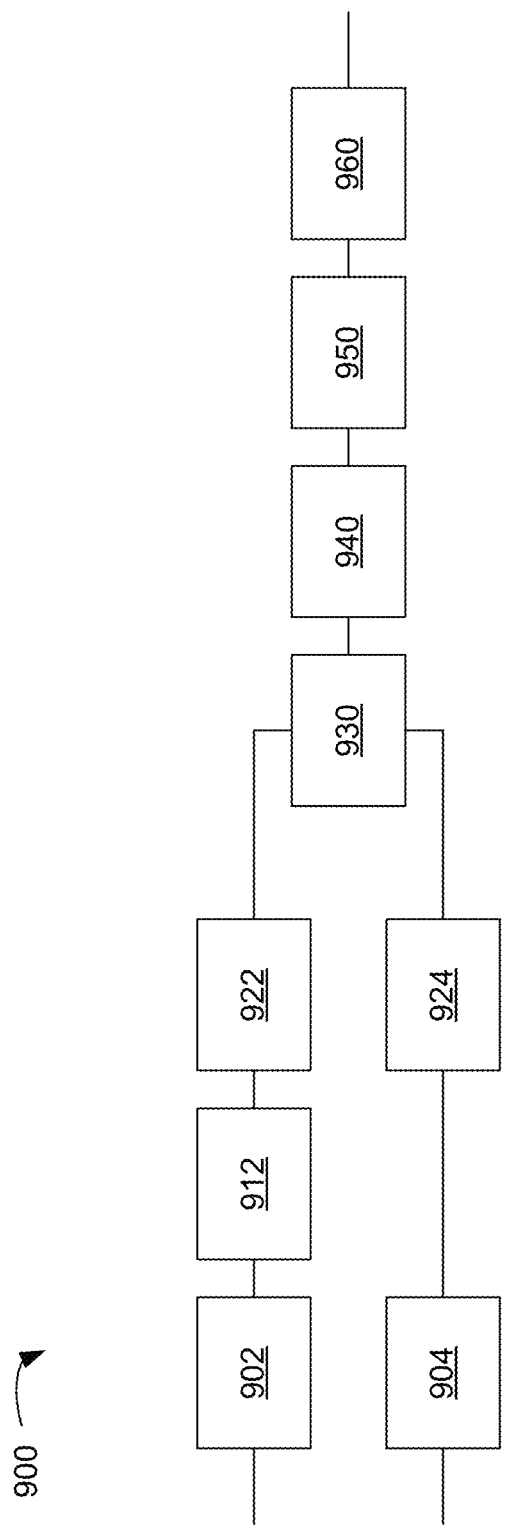
FIG. 9 is a block diagram illustrating an image processing unit in accordance with some embodiments.

FIG. 9 is a block diagram illustrating an image processing unit 900 in accordance with some embodiments. In some embodiments, the image processing unit 900 is included in the one or more processors 575 of the DCA 520. In some embodiments, the image processing unit 900 is implemented as a dedicate circuit (e.g., an application-specific integrated circuit) or a device. In some embodiments, the image processing unit 900 is implemented in a device with one or more processors and memory.

The image processing unit 900 includes a receiver 902 that receives infrared image information (e.g., intensities of infrared light detected by an array of infrared sensors) for a three-dimensional area. In some embodiments, the received infrared image information corresponds to an entire area of an infrared image sensor. In some embodiments, the received infrared image information corresponds to a subset, less than all, of the entire area of the infrared image sensor (e.g., infrared image information corresponding to the entire area of the infrared image sensor may be divided into a plurality of non-overlapping blocks, which may have a same size, such as rectangles of an equal size, and the received infrared image corresponds to a single block). In some embodiments, the receiver 902 includes an 8-bit to 10-bit encoder.

The image processing unit 900 also includes a receiver 904 that receives non-infrared image information (e.g., intensities of non-infrared light detected by an array of non-infrared sensors, where the non-infrared sensors are configured to detect a particular color, such as red, green, or blue, or the non-infrared sensors include, or are, monochrome sensors) for the same three-dimensional area. In some embodiments, the received non-infrared image information corresponds to an entire area of a non-infrared image sensor. In some embodiments, the received non-infrared image information corresponds to a subset, less than all, of the entire area of the non-infrared image sensor (e.g., non-infrared image information corresponding to the entire area of the non-infrared image sensor may be divided into a plurality of non-overlapping blocks, which may have a same size, such as rectangles of an equal size, and the received non-infrared image corresponds to a single block). In some embodiments, the receiver 904 includes an 8-bit to 10-bit encoder.

In some embodiments, the image processing unit 900 includes a denoiser 912 that reduces noise in the received image information (e.g., the infrared image information received by the receiver 902 or the non-infrared image information received by the receiver 904). In some embodiments, the image processing unit 900 applies a blurring (e.g., Gaussian blurring) to the received image information for reducing the noise in the received image information.

The image processing unit 900 also includes at least one of: an intensity adjuster 922 that adjusts the intensity of the received infrared image information (or the denoised infrared image information) or an intensity adjuster 924 that adjusts the intensity of the received non-infrared image information (or the denoised non-infrared image information). In some embodiments, the image processing unit 900 includes both the intensity adjuster 922 and the intensity adjuster 924. In some embodiments, at least one of: the intensity adjuster 922 and the intensity adjuster 924 performs a nonlinear intensity adjustment, such as Gamma correction.

The image processing unit 900 includes a blender 930 that combines the infrared image information (e.g., the intensity-adjusted infrared image information) and the non-infrared image information (e.g., the intensity-adjusted non-infrared image information) to obtain a merged image information. In some embodiments, the blender 930 determines a sum (e.g., pixel-by-pixel sum so that a sum of an x-by-y-pixel infrared image and an x-by-y-pixel non-infrared image provides an x-by-y-pixel merged image) of the infrared image information (e.g., the intensity-adjusted infrared image information) and the non-infrared image information (e.g., the intensity-adjusted non-infrared image information). In some embodiments, the blender 930 determines a weighted sum of the infrared image information (e.g., the intensity-adjusted infrared image information) and the non-infrared image information (e.g., the intensity-adjusted non-infrared image information) to obtain the merged image information.

In some embodiments, the image processing unit 900 includes a compressor 940 that compresses the merged image. In some embodiments, the image processing unit 900 includes at least one of: a cropper or a scaler, which may be implemented as a single cropper/scaler 950. The cropper/scaler 950 crops and scales the merged image. In some embodiments, the image processing unit 900 included a flattener 960 that flattens the merged image (or the cropped and scaled image). Although FIG. 9 shows a configuration of the image processing unit 900, in which the compressor 940, the cropper/scaler 950, and the flattener 960 are arranged in a particular order. However, in other configurations of the image processing unit 900, the compressor 940, the cropper/scaler 950, and the flattener 960 may be arranged in different orders. In some configurations of the image processing unit 900, one or more of the compressor 940, the cropper/scaler 950, and the flattener 960 may be omitted.

The image processing unit 900 outputs the merged image information (with or without further processing, such as compression, cropping/scaling, or flattening) for depth sensing.

Figure 10:
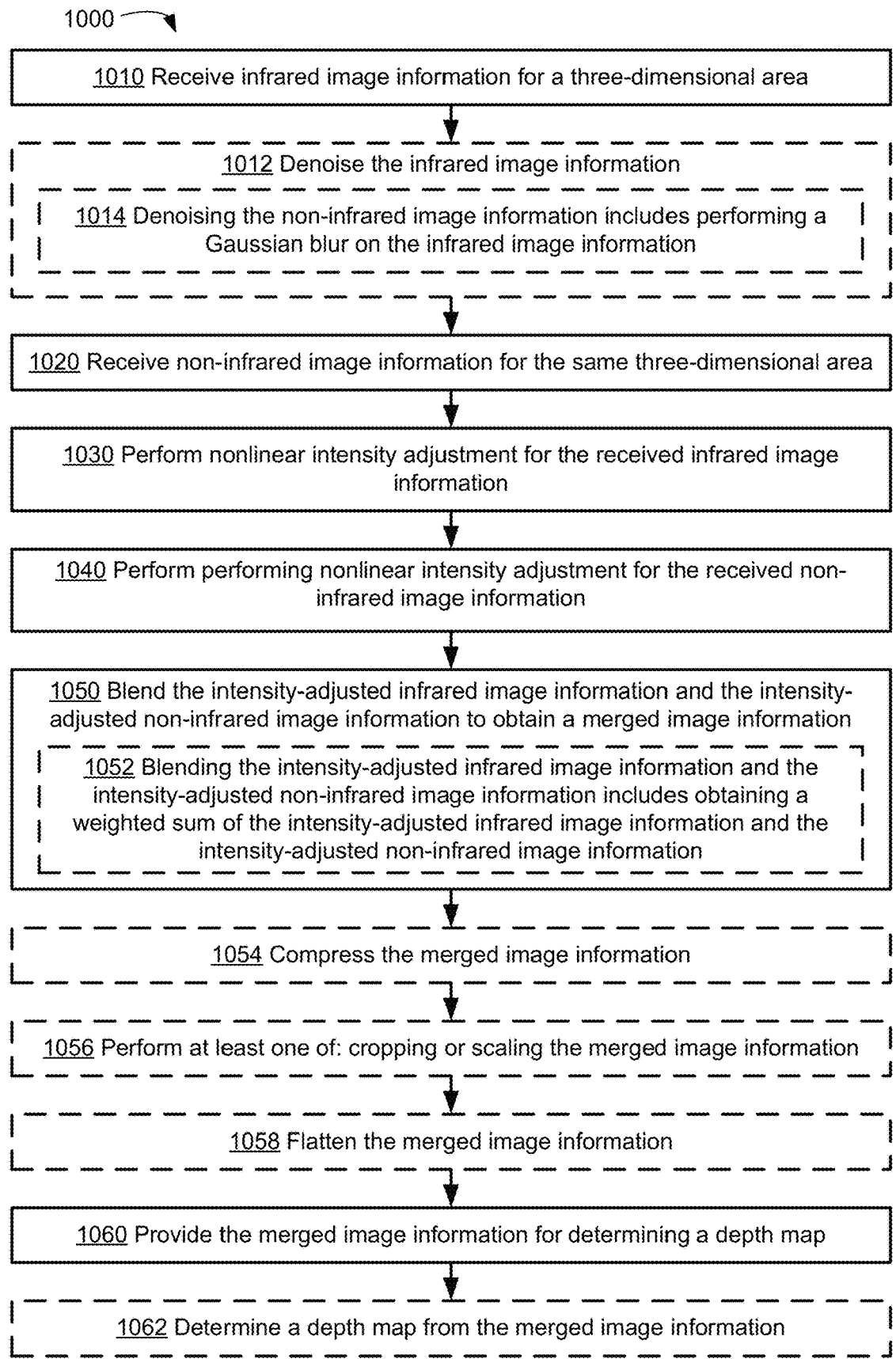
FIG. 10 is a flow diagram illustrating a method of processing an image in accordance with some embodiments.

FIG. 10 is a flow diagram illustrating a method 1000 of processing an image in accordance with some embodiments.

Method 1000 includes (1010) receiving infrared image information for a three-dimensional area (e.g., with the receiver 902), and (1020) receiving non-infrared image information for the same three-dimensional area (e.g., with the receiver 904).

In some embodiments, the received infrared image information and the received non-infrared image information correspond to a same number of pixels. In some embodiments, the received infrared image information is obtained from a particular number of infrared sensors and the received non-infrared image information is obtained from the same particular number of non-infrared sensors. In some embodiments, the received infrared information corresponds to a first number of pixels and the received non-infrared information corresponds to a second number of pixels different from the first number of pixels. In such cases, in some embodiments, at least one of the received infrared information and the received non-infrared information is processed (e.g., cropped, merged, binned, etc.) so that the infrared information and the non-infrared information, after processing, correspond to a same number of pixels.

In some embodiments, the received infrared image information contains a pattern based on structured infrared illumination onto the three-dimensional area.

In some embodiments, method 1000 includes (1012) denoising the infrared image information (e.g., with the denoiser 912). In some embodiments, denoising the non-infrared image information includes (1014) performing a Gaussian blur on the infrared image information (e.g., with the denoiser 912). For example, a Gaussian blur over 3-by-3 pixels or 5-by-5 pixels may be applied.

Method 1000 also includes (1030) performing nonlinear intensity adjustment for the received infrared image information (e.g., with the intensity adjuster 922), and performing (1040) nonlinear intensity adjustment for the received non-infrared image information (e.g., with the intensity adjuster 924). In some embodiments, performing the non-linear intensity adjustment includes applying Gamma correction.

Method 1000 further includes (1050) blending the intensity-adjusted infrared image information and the intensity-adjusted non-infrared image information to obtain a merged image information (e.g., with the blender 930).

In some embodiments, blending the intensity-adjusted infrared image information and the intensity-adjusted non-infrared image information includes (1052) obtaining a weighted sum of the intensity-adjusted infrared image information and the intensity-adjusted non-infrared image information (e.g., with the blender 930).

In some embodiments, method 1000 includes (1054) compressing the merged image information (e.g., with the compressor 940).

In some embodiments, method 1000 includes (1056) performing at least one of: cropping or scaling the merged image information (e.g., with the cropper/scaler 950).

In some embodiments, method 1000 includes (1058) flattening the merged image information (e.g., with the flattener 960).

Method 1000 includes (1060) providing the merged image information (e.g., as an output of the image processing unit 900) for determining a depth map (e.g., depth mapping). By utilizing the merged image information instead of the infrared image information and the non-infrared image information separately, depth sensing can be completed faster and more efficiently. In addition, the structured infrared illumination improves the accuracy in depth sensing so that an accurate depth map can be obtained.

In some embodiments, method 1000 includes (1062) determining a depth map from the merged image information (e.g., with the one or more processors 575 of the DCA 520). For example, as described above with respect to FIG. 5B, a depth sensing can be performed by applying triangulation on stereoscopic images obtained by two or more image sensors.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An electronic device, comprising:
one or more processors; and
memory storing instructions for execution by the one or more processors, the stored instructions including instructions for:
receiving infrared image information for a three-dimensional area;

receiving non-infrared image information for the same three-dimensional area;

performing nonlinear intensity adjustment for the received infrared image information;

performing nonlinear intensity adjustment for the received non-infrared image information;

blending the intensity-adjusted infrared image information and the intensity-adjusted non-infrared image information to obtain monochrome merged image information including obtaining a weighted sum of the intensity-adjusted infrared image information and the intensity-adjusted non-infrared image information; and subsequent to blending the intensity-adjusted infrared image information and the intensity-adjusted non-infrared image information, providing the monochrome merged image information for determining a depth map.

2. The device of claim 1, wherein the stored instructions include instructions for:

determining a depth map from the monochrome merged image information.

3. The device of claim 1, wherein the stored instructions include instructions for:

denoising the infrared image information.

4. The device of claim 3, wherein denoising the non-infrared image information includes performing a Gaussian blur on the infrared image information.

5. The device of claim 1, wherein the stored instructions include instructions for:

subsequent to blending the intensity-adjusted infrared image information and the intensity-adjusted non-infrared image information, compressing the monochrome merged image information, scaling the monochrome merged image information, and flattening the monochrome merged image information prior to providing the monochrome merged image information for determining a depth map.

6. The device of claim 1, wherein the received infrared image information and the received non-infrared image information correspond to a same number of pixels.

7. The device of claim 1, further comprising:

one or more cameras, a respective camera including a plurality of pixels, a respective pixel of the plurality of pixels including at least one infrared photodetector and at least one non-infrared photodetector positioned adjacent to the at least one infrared photodetector.

8. The device of claim 7, wherein:

both the at least one infrared photodetector and the at least one non-infrared photodetector of the respective pixel are coupled with a common microlens.

9. A method for processing an image, comprising:

receiving infrared image information for a three-dimensional area;

receiving non-infrared image information for the same three-dimensional area;

performing nonlinear intensity adjustment for the received infrared image information;

performing nonlinear intensity adjustment for the received non-infrared image information;

blending the intensity-adjusted infrared image information and the intensity-adjusted non-infrared image information to obtain monochrome merged image information including obtaining a weighted sum of the intensity-adjusted infrared image information and the intensity-adjusted non-infrared image information; and subsequent to blending the intensity-adjusted infrared image information and the intensity-adjusted non-infrared image information, providing the monochrome merged image information for determining a depth map.

10. The method of claim 9, further comprising:

determining a depth map from the monochrome merged image information.

11. The method of claim 9, further comprising:

denoising the infrared image information.

12. The method of claim 11, wherein denoising the non-infrared image information includes performing a Gaussian blur on the infrared image information.

13. The method of claim 9, further comprising:

subsequent to blending the intensity-adjusted infrared image information and the intensity-adjusted non-infrared image information, compressing the monochrome merged image information, scaling the monochrome merged image information, and flattening the monochrome merged image information prior to providing the monochrome merged image information for determining a depth map.

14. The method of claim 9, wherein the received infrared image information and the received non-infrared image information correspond to a same number of pixels.

15. A non-transitory computer readable storage medium storing instructions, which, when executed by one or more processors of an electronic device, cause the electronic device to:

receive infrared image information for a three-dimensional area;

receive non-infrared image information for the same three-dimensional area;

perform nonlinear intensity adjustment for the received infrared image information;

perform nonlinear intensity adjustment for the received non-infrared image information;

blend the intensity-adjusted infrared image information and the intensity-adjusted non-infrared image information to obtain monochrome merged image information including obtaining a weighted sum of the intensity-adjusted infrared image information and the intensity-adjusted non-infrared image information; and subsequent to blending the intensity-adjusted infrared image information and the intensity-adjusted non-infrared image information, provide the monochrome merged image information for determining a depth map.

16. The device of claim 1, wherein the monochrome merged image information consists of a sum of the intensity-adjusted infrared image information and the intensity-adjusted non-infrared image information.

17. The method of claim 9, further comprising:

before receiving the infrared image information for the three-dimensional area:

projecting with an illumination device an infrared light pattern onto a local area;

capturing an infrared image using one or more imaging devices; and receiving the infrared image information captured from the infrared image.

18. The device of claim 1, further comprising:

an illumination device for projecting an infrared light pattern onto a local area; and one or more imaging devices for capturing an infrared image, wherein a respective imaging device of the one or more imaging devices includes a plurality of pixels, a respective pixel of the plurality of pixels including at least one infrared photodetector and at least one non-infrared photodetector positioned adjacent to the at least one infrared photodetector.

* * * * *